US008012006B2

(12) United States Patent
Koganezawa et al.

(10) Patent No.: US 8,012,006 B2
(45) Date of Patent: Sep. 6, 2011

(54) GAME PROGRAM PRODUCT, GAME APPARATUS AND GAME METHOD INDICATING A DIFFERENCE BETWEEN ALTITUDE OF A MOVING OBJECT AND HEIGHT OF AN ON-EARTH OBJECT IN A VIRTUAL WORD

(75) Inventors: Tsutomu Koganezawa, Kyoto (JP); Takayuki Haga, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1262 days.

(21) Appl. No.: 11/491,960

(22) Filed: Jul. 25, 2006

(65) Prior Publication Data
US 2007/0265044 A1 Nov. 15, 2007

(30) Foreign Application Priority Data

May 1, 2006 (JP) ................................. 2006-127702

(51) Int. Cl.
*A63F 9/24* (2006.01)
(52) U.S. Cl. ...................... 463/7; 463/3; 463/5; 463/36
(58) Field of Classification Search ............... 463/3, 5, 463/7, 36, 42
See application file for complete search history.

(56) References Cited

U.S. PATENT DOCUMENTS

| 6,657,627 | B1 * | 12/2003 | Wada et al. .................... 345/473 |
| 6,692,357 | B2 * | 2/2004 | Koizumi et al. ................. 463/32 |
| 6,935,954 | B2 * | 8/2005 | Sterchi et al. .................... 463/31 |
| 2004/0218910 | A1 * | 11/2004 | Chang et al. ..................... 386/98 |
| 2005/0192071 | A1 * | 9/2005 | Matsuno et al. ................... 463/1 |
| 2005/0233806 | A1 * | 10/2005 | Kane et al. ....................... 463/31 |
| 2006/0223635 | A1 * | 10/2006 | Rosenberg ....................... 463/37 |

FOREIGN PATENT DOCUMENTS

| JP | 2000-176156 | | 6/2000 |
| JP | 2000176156 | * | 6/2000 |
| JP | 2000176156 A | * | 6/2000 |
| JP | 2002-123166 | | 4/2002 |

* cited by examiner

*Primary Examiner* — Dmitry Suhol
*Assistant Examiner* — Brandon Gray
(74) *Attorney, Agent, or Firm* — Nixon & Vanderhye P.C.

(57) ABSTRACT

A game apparatus includes an LCD. An on-earth object existing in a virtual game space is reproduced on the LCD from a viewpoint of capturing ahead of a flying object moving in the virtual game space. A velocity parameter and a direction parameter which defines the movement parameter of the flying object are changed in response to a button operation by a player. An altitude where the flying object will reach after a lapse of a time T (T>0) is predicted on the basis of the movement parameter of the flying object. A height above the sea level of the on-earth object existing in the predicted point is detected with reference to map data. Difference information indicating a difference between the detected height above the sea level of the on-earth object and altitude of the flying object is output to the player through the LCD.

38 Claims, 14 Drawing Sheets (A) FLASHING:2.5times/sec (B) FLASHING:7.5times/sec (A) FLASHING: 2.5times/sec

AFTER LAPSE OF 1.0 SECOND     AFTER LAPSE OF 2.0 SECONDS (B) FLASHING: 7.5times/sec

AFTER LAPSE OF 1.0 SECOND     AFTER LAPSE OF 2.0 SECONDS

GAME PROGRAM PRODUCT, GAME APPARATUS AND GAME METHOD INDICATING A DIFFERENCE BETWEEN ALTITUDE OF A MOVING OBJECT AND HEIGHT OF AN ON-EARTH OBJECT IN A VIRTUAL WORD

CROSS REFERENCE OF RELATED APPLICATION

The disclosure of Japanese Patent Application No. 2006-127702 is incorporated herein by reference.

BACKGROUND OF THE INVENTION

1. Field of Technology

Example embodiments of the present invention relate to a game program product, a game apparatus, or a game method. More specifically, example embodiments of the present invention relate to a game program product, a game apparatus, or a game method which reproduces one or more first objects existing in an XY-plane forming a virtual XYZ space from a viewpoint of capturing ahead of a second object moving in the virtual XYZ space.

2. Description of the Related Art

A game called "flight simulator" in which an airplane flies in a virtual game space in response to a player's operation has conventionally been known. Such a game displays a flight altitude indicating how high the airplane flies. In some of them, an image taking a shape of an actual altimeter is displayed on a display monitor like in the Patent Document 1 (Japanese Patent Laying-open 2000-176156) or the Patent Document 2 (Japanese Patent Laying-open 2002-123166), enhancing reality.

In such a game, a player is required to operate such that an airplane does not crash into an on-earth object, such as a mountain, a building, etc. arranged in a virtual game space. However, how far the airplane flies from the on-earth object cannot easily be grasped from only the altitude of the airplane. Thus, only by utilizing the airplane and the on-earth object to be displayed on the screen, the player can predict the distance from the on-earth object to the airplane, and this is one reason of making the game, such as the flight simulator difficult.

SUMMARY

Therefore, it is one aspect of example embodiments of the present invention to provide a novel game program product, a game apparatus, or a game method.

Another aspect of example embodiments of the present invention is to provide a game program product, a game apparatus, or a game method capable of ease difficulties associated with the operation.

A game program product according to example embodiments of the present invention is a program product to cause a processor of a game apparatus which displays a virtual game space in which an on-earth object is arranged, and a moving object moving in the virtual game space on a screen to execute a changing step, a predicting step, a first detecting step, a second detecting step, and an output step. The changing step is a step for changing a movement parameter defining a movement of the moving object in response to a player's operation. The predicting step is for predicting a reaching point where the moving object will reach after a lapse of a time T (T>0) on the basis of the movement parameter. The first detecting step is for detecting at least any one of a current altitude of the moving object and an altitude of the moving object in the reaching point predicted by the predicting step. The second detecting step is for detecting a height of the on-earth object in the reaching point predicted by the predicting step. The output step is for outputting to the player difference information indicating a difference between the altitude detected by the first detecting step and the height detected by the second detecting step.

An on-earth object (200: reference numeral designating a portion corresponding in the embodiments) is arranged in a virtual game space. A moving object (100) moves in the virtual game space. These on-earth object and moving object are displayed on the screen. A movement parameter for defining the movement of the moving object is changed by a changing step (S19, S25, S29, S35, S49, S51, S53, S55) in response to a player's operation. A reaching point the moving object will reach after a lapse of a time T(T>0) is predicted by a predicting step (S81) on the basis of the movement parameter. At least any one of a current altitude of the moving object and an altitude of the moving object in the reaching point predicted by the predicting step is detected by a first detecting step (S73). The height of the on-earth object in the reaching point to be predicted by the predicting step is detected by a second detecting step (S83). The difference information indicating a difference between the altitude detected by the first detecting step and the height detected by the second detecting step is output to the player by the output step (S99, S101).

The height detected by the second detecting step is the height of the on-earth object where the moving object will reach after a lapse of the time T. The difference information indicating the difference between the height and the altitude of the moving object is output to the player, and whereby, it is possible to ease difficulty in operating the moving object.

It is preferable that the output step includes a first information output step and a second information output step. The first information output step is a step for outputting height information indicating the height as a part of the difference information, and the second information output step is a step for outputting altitude information indicating the altitude as another part of the difference information.

The height information indicating the height is output in the first information output step as a part of the difference information (S99). The altitude information indicating the altitude is output in the second information output step as another part of the difference information (S101). Thus, it is possible to precisely recognize the height of the on-earth object and the altitude of the moving object.

More preferably, the height information includes a first bar character extending in a vertical direction of the screen with a length corresponding to the height, and the altitude information includes a second bar character extending in the vertical direction of the screen with a length corresponding to the altitude.

The height information includes a first bar character (B1), and the altitude information includes a second bar character (B2). The first bar character is a character extending in a vertical direction of the screen with a length corresponding to the height, and the second bar character is a character extending in the vertical direction of the screen with a length of the altitude. By displaying the bar characters extending in the vertical direction, the player can intuitively understand the above-described distance.

It is preferable that the first bar character has a bar main body extending upward from a lower side of the screen and an upper edge portion set at a position corresponding to the height, and the second bar character has a bar main body extending downward from an upper side of the screen and a lower edge portion set at a position corresponding to the altitude, and a space from the upper edge portion to the lower edge portion means a difference between the height and the altitude. This allows the player to know that the moving character contacts the on-earth object, and this prevents an operating error such as the moving character crashing into the on-earth object, and so forth.

Preferably, the first information output step determines the length of the first bar character by a logarithmic arithmetic. Thus, even the screen with a smaller size can precisely represent the height of the on-earth object.

More, preferably, a warning step for outputting a different warning depending on a numerical range to which a subtracted value obtained by subtracting the height detected by the detecting step from the altitude predicted by the predicting step belongs (S115, S117) is executed by the processor.

The subtracted value is obtained by subtracting the height detected by the detecting step from the altitude predicted by the predicting step. In the warning step (S115, S117), a different warning is output depending on the numerical range to which such a subtracted value belongs. Thus, it is possible to apply a reminder depending on the distance from the moving object to the on-earth object, capable of enhancing the usability.

It is more preferable that the warning step includes a first warning output step for outputting the warning in a first manner when the subtracted value belongs to a first numerical range where numerical values above 0 are distributed, and a second warning output step for outputting the warning in a second manner when the subtracted value belongs to a second numerical range where numerical values below 0 are distributed.

When the subtracted value belongs to a first numerical range where numerical values above 0 are distributed, the warning is output by the first warning output step in a first manner (S115). When the subtracted value belongs to a second numerical range where numerical values below 0 are distributed, the warning is output by the second warning output step in a second manner (S117). Thus, it is possible to apply a reminder to the player in a different manner depending on the distance from the moving object to the on-earth object, capable of enhancing the usability.

Preferably, a setting step for setting each of a plurality of numerical values as the time T, a subtracting step for respectively subtracting a plurality of the heights detected by the second detecting step from a plurality of the altitudes detected by the first detecting step with referring to the plurality of reaching points predicted by the predicting step, and a specifying step for specifying a minimum subtracted value out of the plurality of subtracted values calculated by the subtracting step are further executed by a processor. Also, the output step outputs the difference information corresponding to the minimum subtracted value specified by the specifying step. Furthermore, the output step outputs the difference information corresponding to the minimum subtracted value specified by the specifying step.

Each of the plurality of numerical values is set as the time T by a setting step (S79, S89). In a subtracting step (S85), a plurality of the heights detected by the second detecting step is respectively subtracted from a plurality of the altitudes detected by the first detecting step with respect to the plurality of reaching points predicted by the predicting step. In a specifying step (S91), a minimum subtracted value is specified out of the plurality of subtracted values calculated by the subtracting step. Here, the height noted for the outputting process in the output step is equal to the minimum subtracted value specified by the specifying step.

On the understanding that each of the first time and the second time longer than the first time is set as a predetermined time, when the moving direction of the moving object is sharply changed, the distance from the moving object to the on-earth object is enough for the reaching position after a lapse of the second time, and is not enough for the reaching position after a lapse of the first time. Taking this sort of problem into account, a size corresponding to the minimum subtracted value is noted. Thus, it is possible to enhance the usability.

More preferably, the changing step includes a first change step for changing a direction parameter defining a moving direction of the moving object in response to a first operation by a player, and a second change step for changing a velocity parameter defining a moving velocity of the moving object in response to a second operation by the player.

A direction parameter for defining a moving direction of the moving object is changed by a first change step in response to a first operation by a player (S49, S51, S53, S55). A velocity parameter for defining a moving velocity of the moving object is changed by a second change step in response to a second operation by the player (S19, S25, S29, S35). The position where the moving object reaches after a lapse of the time T depends on the direction parameter and the velocity parameter.

A game apparatus according to example embodiments of the present invention is a game apparatus which displays on a screen a virtual game space in which an on-earth object is arranged and a moving object moving in the virtual game space, and comprises a change means, a predicting means, a first detecting means, a second detecting means, and an output means. The change means changes a movement parameter defining a movement of the moving object in response to a player's operation. The predicting means predicts a reaching point where the moving object will reach after a lapse of a time T (T>0) on the basis of the movement parameter. The first detecting means detects at least any one of a current altitude of the moving object and an altitude of the moving object in the reaching point predicted by the predicting means. The second detecting means detects a height of the on-earth object in the reaching point predicted by the predicting means. The output means outputs to the player difference information indicating a difference between the altitude detected by the first detecting means and the height detected by the second detecting means.

An on-earth object (200) is arranged in a virtual game space. A moving object (100) moves in the virtual game space. These on-earth object and moving object are displayed on the screen. A movement parameter for defining the movement of the moving object is changed by a change means in response to a player's operation (S19, S25, S29, S35, S49, S51, S53, S55). A reaching point where the moving object will reach after a lapse of a time T(T>0) is predicted by a predicting means on the basis of the movement parameter (S81). At least any one of a current altitude of the moving object and an altitude of the moving object in the reaching point predicted by the predicting means is detected by a first detecting means (S73). A height of the on-earth object in the reaching point predicted by the predicting means is detected by a second detecting means (S83). The difference information indicating a difference between the altitude detected by the first detecting means and the height detected by the second detecting means is output to the player by the output means (S99, S101). As described above, it is possible to ease difficulty in operating the second object.

A game method according to example embodiments of this invention is a game method to be executed by a game apparatus which displays on a screen a virtual game space in which an on-earth object is arranged and a moving object moving in the virtual game space, and comprises a following steps (a)-(e). In a step (a), a movement parameter defining a movement of the moving object is changed in response to a player's operation. In a step (b), a reaching point where the moving object will reach after a lapse of a time T (T>0) is predicted on the basis of the movement parameter. In a step (c), at least any one of a current altitude of the moving object and an altitude of the moving object in the reaching point predicted by the step (b) is detected. The height of the on-earth object in the reaching point predicted by the step (b) is detected in a step (d). Difference information indicating a difference between the altitude detected by the step (c) and the height detected by the step (d) is output to the player in a step (e). As described above, it is possible to ease difficulty in operating the second object.

The above described features, aspects and advantages of example embodiments of the present invention will become more apparent from the following detailed description of example embodiments of the present invention when taken in conjunction with the accompanying drawings.

DETAILED DESCRIPTION OF THE EXAMPLE EMBODIMENTS

Figure 1:
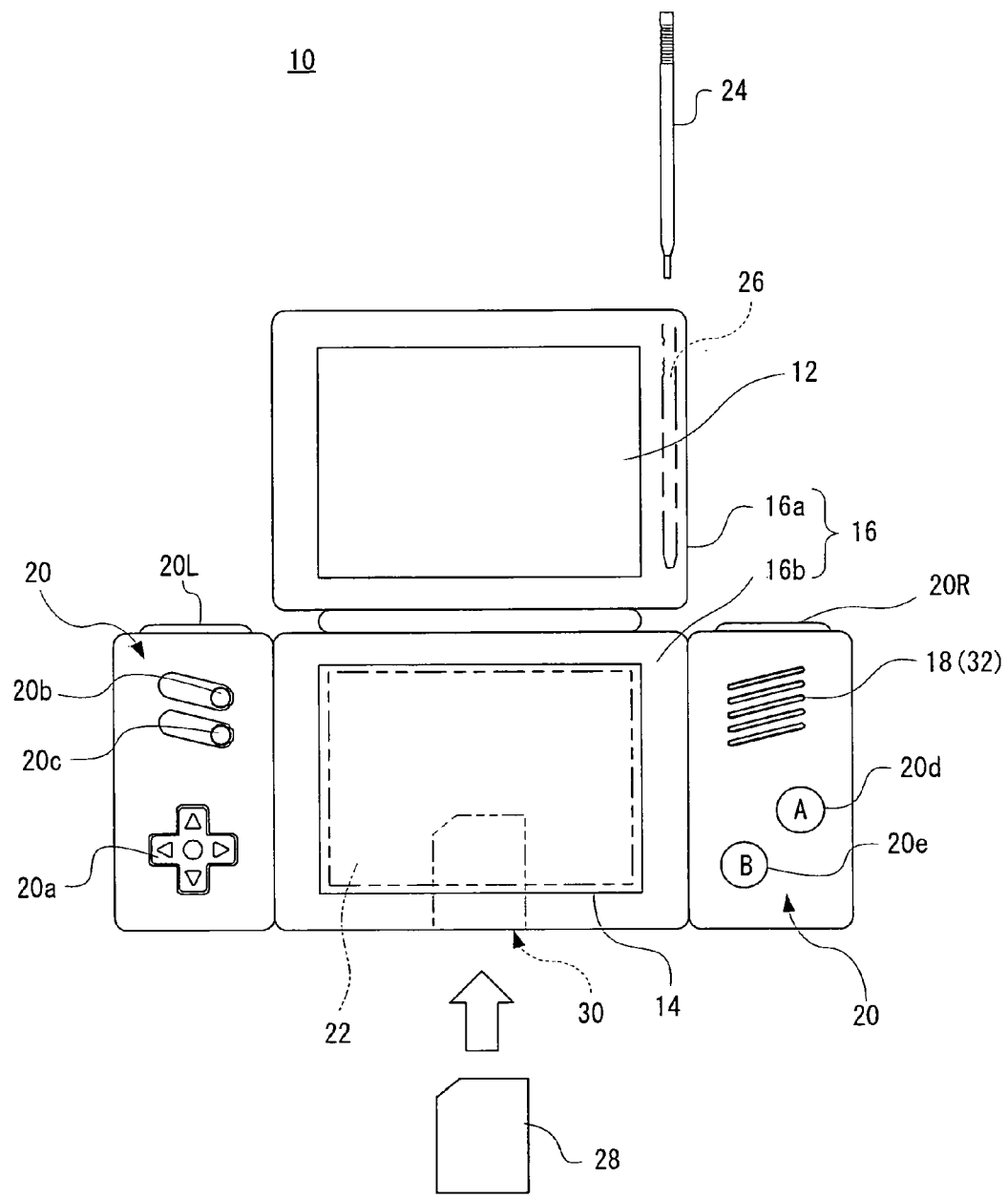
FIG. 1 is an appearance view showing one example of a game apparatus of one example embodiment of the present invention.

Referring to FIG. 1, a game apparatus 10 of one example embodiment of this invention includes a first liquid crystal display (LCD) 12 and a second LCD 14. The LCDs 12 and 14 are provided on a housing 16 so as to be arranged in a predetermined position. In this embodiment, the housing 16 comprises an upper housing 16a and a lower housing 16b. The LCD 12 is provided on the upper housing 16a while the LCD 14 is provided on the lower housing 16b.

Accordingly, these LCDs 12 and 14 are closely arranged so as to be longitudinally (vertically) parallel with each other.

It is noted that although the LCD is utilized as a display in this embodiment, an EL (Electronic Luminescence) display and a plasma display may be used in place of the LCD.

As can be understood from FIG. 1, the upper housing 16a has a plane shape little larger than a plane shape of the LCD 12, and has an opening formed so as to expose a display surface of the LCD 12 from one main surface thereof. On the other hand, the lower housing 16b has a plane shape horizontally longer than the upper housing 16a, and has an opening formed so as to expose a display surface of the LCD 14 at an approximately center of the horizontal direction. Furthermore, the lower housing 16b is provided with a sound hole 18 and an operating switch 20 (20a, 20b, 20c, 20d, 20e, 20L and 20R).

In addition, the upper housing 16a and the lower housing 16b are rotatably connected at a lower side (lower edge) of the upper housing 16a and a part of an upper side (upper edge) of the lower housing 16b. Accordingly, in a case of not playing a game, for example, if the upper housing 16a is rotated to be folded such that the display surface of the LCD 12 and the display surface of the LCD 14 are face to face with each other, it is possible to prevent the display surface of the LCD 12 and the display surface of the LCD 14 from being damaged, such as a surface flaw. It is should be noted that the upper housing 16a and the lower housing 16b are not rotatably connected with each other, but these are provided in an integrated (fixed) fashion to form the housing 16.

The operating switch 20 includes a direction instructing switch (cross key) 20a, a start switch 20b, a select switch 20c, an action switch (A button) 20d, an action switch (B button) 20e, an action switch (L button) 20L, and an action switch (R button) 20R. The switches 20a, 20b and 20c are placed at the left of the LCD 14 on the one main surface of the lower housing 16b. Also, the switches 20d and 20e are placed at the right of the LCD 14 on the one main surface of the lower housing 16b. Furthermore, the switches 20L and 20R are placed in a part of an upper edge (top surface) of the lower housing 16b, and lie of each side of the connected portion with the upper housing 16a, that is, besides the connected portion.

A role of each switch of the operating switch 20 is set for each game as necessary. The direction instructing switch 20a functions as a digital joystick, and is utilized for instructing a moving direction of a player character (or player object) to be operated by a player, instructing a moving direction of a cursor, and so forth by operating any one of the four depression portions. The start switch 20b is formed of a push button, and is utilized for starting (restarting), temporarily stopping (pausing) a game, and so forth. The select switch 20c is formed of the push button, and utilized for a game mode selection, etc.

The action switch 20d, that is, the A button 20d is formed of the push button, and allows the player character to perform an arbitrary action except for instructing the direction such as hitting (punching), throwing, holding (obtaining), riding, jumping, etc. For example, in an action game, it is possible to apply an instruction of jumping, punching, moving arms, etc. In a role-playing game (RPG) and a simulation RPG, it is possible to apply an instruction of obtaining an item, selecting and determining arms or command, etc. The action switch 20e, that is, the B button 20e is formed of the push button, and is utilized for changing a game mode selected by the select switch 20c, canceling an action determined by the A button 20d, and so forth.

The action switch 20L (left depression button) and the action switch 20R (right depression button) are formed of the push button. The left depression button (L button) 20L and the right depression button (R button) 20R can be utilized for the same operation as the A button 20d and the B button 20e, and can also be utilized for an operation of a subsidiary of the A button 20d and the B button 20e.

Also, the game apparatus 10 is a game apparatus with the use of a touch panel, and the touch panel 22 is provided on a top surface of the LCD 14. As a touch panel 22, one which can detect a pointing position of at least one point is utilized. More specifically, a resistance film system, an optical system utilizing an infrared rays system, and an electrostatic capacitive coupling system of that kind can be utilized.

In response to an operation (touch operation) by depressing, stroking (touching), and so forth with a stick 24 or a pen (stylus pen), or a finger (hereinafter, referred to as "stick 24, etc.") on a top surface of the touch panel 22, the touch panel 22 detects a pointing position of the stick 24, etc. to output coordinates data indicating the coordinate value of the pointing position. For the touch panel capable of simultaneously detecting the two pointing positions, if the two points are touched by the player, the coordinate data including the coordinate values of the two pointing positions are output.

It is noted that in this embodiment, a resolution of the display surface of the LCD 14 is 256 dots×192 dots (this is true for the LCD 12), and a detection accuracy of the touch panel 22 is also rendered 256 dots×192 dots in correspondence to the resolution of the display surface. However, the detection accuracy of the touch panel 22 may be lower than the resolution of the display surface, or higher than it.

For example, a game screen to be viewed by the player is displayed on the LCD 12, and a game screen to be viewed and operated by the player in association with the game screen of the LCD 12 is displayed on the LCD 14 on which the touch panel 22 is set. On the game screen to be displayed on the LCD 12, a player character appearing in the game space may be included. Also, on the game screen to be displayed on the LCD 14, a guide to instruct how to operate the player character by a touch input with the stick, etc. 24 may be included, and an object, an icon, textual information, or the like which can be touched may be included.

It should be noted that if a touch-operatable object, etc. is displayed on the LCD 14, the player operates the touch panel 22 so as to directly touch the object with the stick 24, etc., for example to thereby select or operate the object, perform a coordinate input instruction, and so forth. Also, it is possible to instruct other various input instructions depending on the kind of the game. For example, it is possible to select a command according to texture information, an icon, etc. to be displayed on the display screen of the LCD 14, and instruct a scrolling (gradual movement display) direction of the game screen (map) displayed on the LCD 12.

Thus, the game apparatus 10 has the LCD 12 and the LCD 14 as a display portion of two screens, the touch panel 22 is provided on either of the display screens (LCD 14 in this embodiment), and therefore, the game apparatus 10 has the two screens (LCD 12, 14) and the two systems of the operating portions (20, 22).

It should be noted that the game apparatus 10 is for controlling the movement of the player character appearing in the game space on the basis of the touch panel operation. Accordingly, out of the above-described operation of each of the operating switch 20, some operations relating to the movement control of the player character are assigned to the operation with the touch panel 22, and therefore, these operations may be set so as not to function when there is an operation from the operating switch 20.

Furthermore, in this embodiment, the stick 24 can be inserted into a housing portion (housing slot) 26 provided on a side surface (right side surface) of the upper housing 16a, for example, and taken out therefrom as necessary. It should be noted that in a case of preparing no stick 24, the housing portion 26 need not to be provided.

Also, the game apparatus 10 includes a memory card (or game cartridge) 28. The memory card 28 is detachable, and inserted into a loading slot 30 provided on a rear surface or a lower edge (bottom surface) of the lower housing 16b. Although illustration is omitted in FIG. 1, a connector 46 (see FIG. 2) is provided at a depth portion of the loading slot 30 for connecting a connector (not shown) provided at an end portion of the memory card 28 in the loading direction. Therefore, when the memory card 28 is loaded into the loading slot 30, the connectors are connected with each other, and the memory card 28 is accessible by a CPU core 42 (see FIG. 2) of the game apparatus 10.

It should be noted that although it is not illustrated in FIG. 1, a speaker 32 (see FIG. 2) is provided at a position corresponding to the sound hole 18 inside the lower housing 16b.

Furthermore although omitted in FIG. 1, a battery accommodating box is provided on a rear surface of the lower housing 16b, for example. A power switch, a volume adjustment switch, an external expansion connector, an earphone jack, etc. are provided on a bottom surface of the lower housing 16b.

Figure 2:
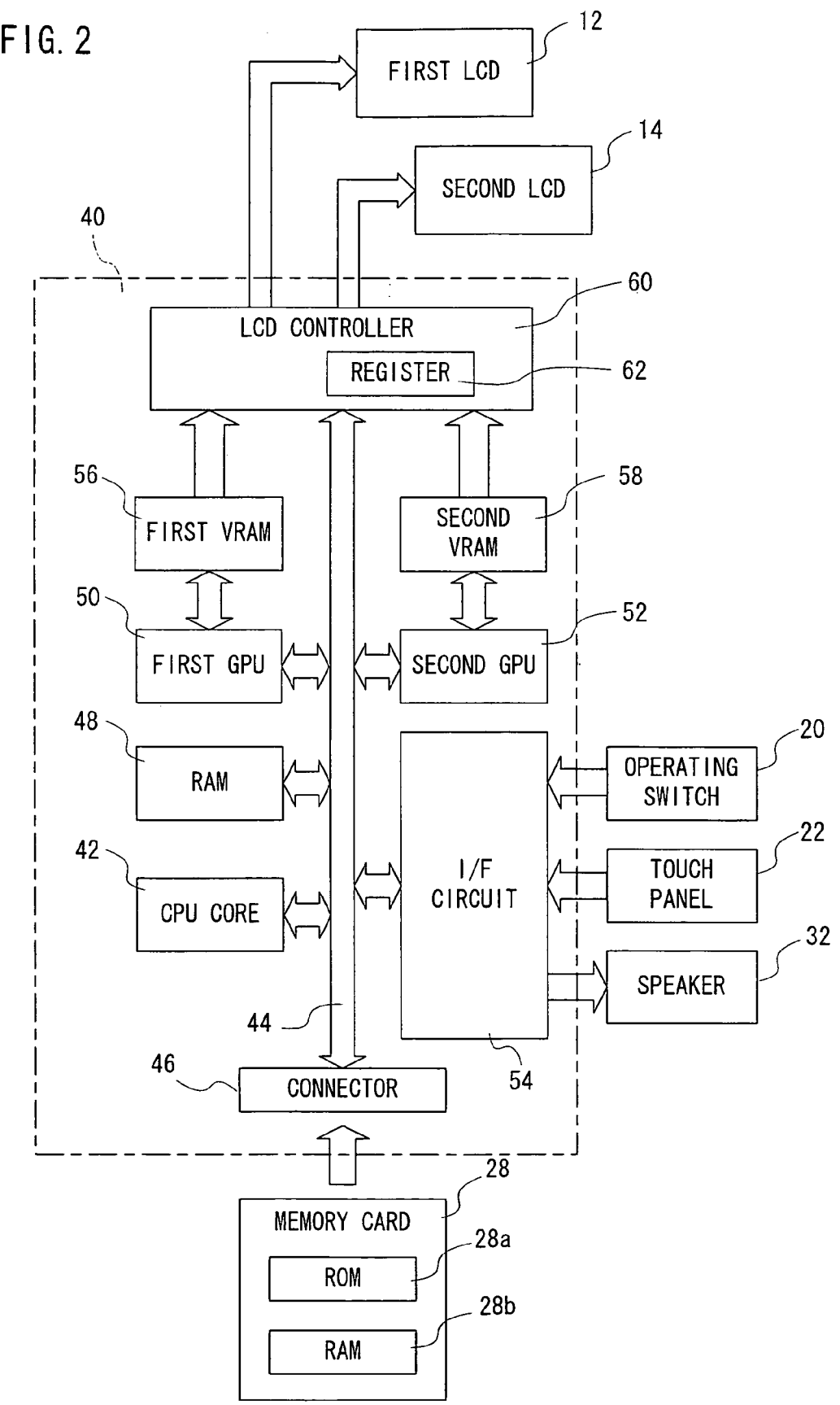
FIG. 2 is a block diagram showing an electric configuration of the game apparatus of FIG. 1 embodiment.

FIG. 2 is a block diagram showing an electric configuration of the game apparatus 10. Referring to FIG. 2, the game apparatus 10 includes an electronic circuit board 40, and on the electronic circuit board 40, a circuit component such as the CPU core 42, etc. is mounted. The CPU core 42 is connected to the connector 46 via a bus 44, a RAM 48, a first Graphics Processing Unit (GPU) 50, a second GPU 52, an input/output interface circuit (hereinafter, referred to as "I/F circuit") 54, and an LCD controller 60.

The connector 46 is detachably connected with the memory card 28 as described above. The memory card 28 includes a ROM 28a and a RAM 28b. Although illustration is omitted, the ROM 28a and the RAM 28b are connected with each other via a bus, and also connected with a connector (not shown) to be connected with the connector 46. Accordingly, as described above, the CPU core 42 gains access to the ROM 28a and the RAM 28b.

The ROM 28a stores in advance a game program for a game (virtual game) to be executed by the game apparatus 10, image data (character image, background image, item image, message image, etc.), and sound or music data (audio data) necessary for the game. The RAM (backup RAM) 28b saves proceeding data and result data of the game.

The RAM 48 is utilized as a buffer memory or a working memory. That is, the CPU core 42 loads the game program, the image data, the sound data, etc. stored in the ROM 28a of the memory card 28 into the RAM 48, and executes the loaded game program. Furthermore, the CPU core 42 executes the game process while storing in the RAM 48 temporary data (game data, flag data, etc.) in correspondence with progress of the game.

It should be noted that such the game program, the image data, the sound data, etc. are read from the ROM 28a entirely at a time, or partially and sequentially as necessary so as to be stored into the RAM 48.

Each of the GPU 50 and the GPU 52 forms a part of a rendering means, is constructed by, for example, a single chip ASIC. The GPU 50 or 52 receives a graphics command (construction command) from the CPU core 42 to generate game image data according to the graphics command. Here, the CPU core 42 applies to each of the GPU 50 and the GPU 52 an image generating program (included in the game program) necessary for generating the game image data in addition to the graphics command.

It is noted that data (image data: a polygon, a texture, etc.) necessary for executing the graphics command is obtained through the access to the RAM 48 by the GPU 50 or GPU 52.

Also, the GPU 50 is connected to a first video RAM (hereinafter, referred to as "VRAM") 56, and the GPU 52 is connected to a second VRAM 58. The GPU 50 renders the created game image data in the VRAM 56, and the GPU 52 renders the created game image data in the VRAM 58.

The VRAM 56 and 58 are connected to the LCD controller 60. The LCD controller 60 includes a register 62. The register 62 includes one bit, for example, and stores a value (data value) of "0" or "1" according to an instruction of the CPU core 42. The LCD controller 60 outputs the game image data rendered in the VRAM 56 to the LCD 12, and outputs the game image data rendered in the VRAM 58 to the LCD 14 in a case that the data value of the register 62 is "0". Furthermore, the LCD controller 60 outputs the game image data rendered in the VRAM 56 to the LCD 14, and outputs the game image data rendered in the VRAM 58 to the LCD 12 in a case that the data value of the register 62 is "1".

It should be noted that in the above-described example, a description is made that the LCD controller 60 is connected with the VRAM 56 and the VRAM 58 to obtain the image data from these VRAM 56 and VRAM 58. However, the image data rendered in the VRAM 56 and VRAM 58 may be provided to the LCD controller 60 by the GPU 50 and GPU 52 under the CPU core 42's instruction.

The I/F circuit 54 is connected with the operating switch 20, the touch panel 22, and the speaker 32. Here, the operating switch 20 is the above-described switches 20a, 20b, 20c, 20d, 20e, 20L and 20R. When the operating switch 20 is operated, a corresponding operation signal (operation data) is input to the CPU core 42 via the I/F circuit 54. Furthermore, the coordinate data from the touch panel 22 is input to the CPU core 42 via the I/F circuit 54. In addition, the CPU core 42 reads the sound data necessary for the game such as a game music (BGM), a sound effect, an onomatopoeic sound of the game character, etc. from the RAM 48, and outputs it from the speaker 32 via the I/F circuit 54.

Figure 3:
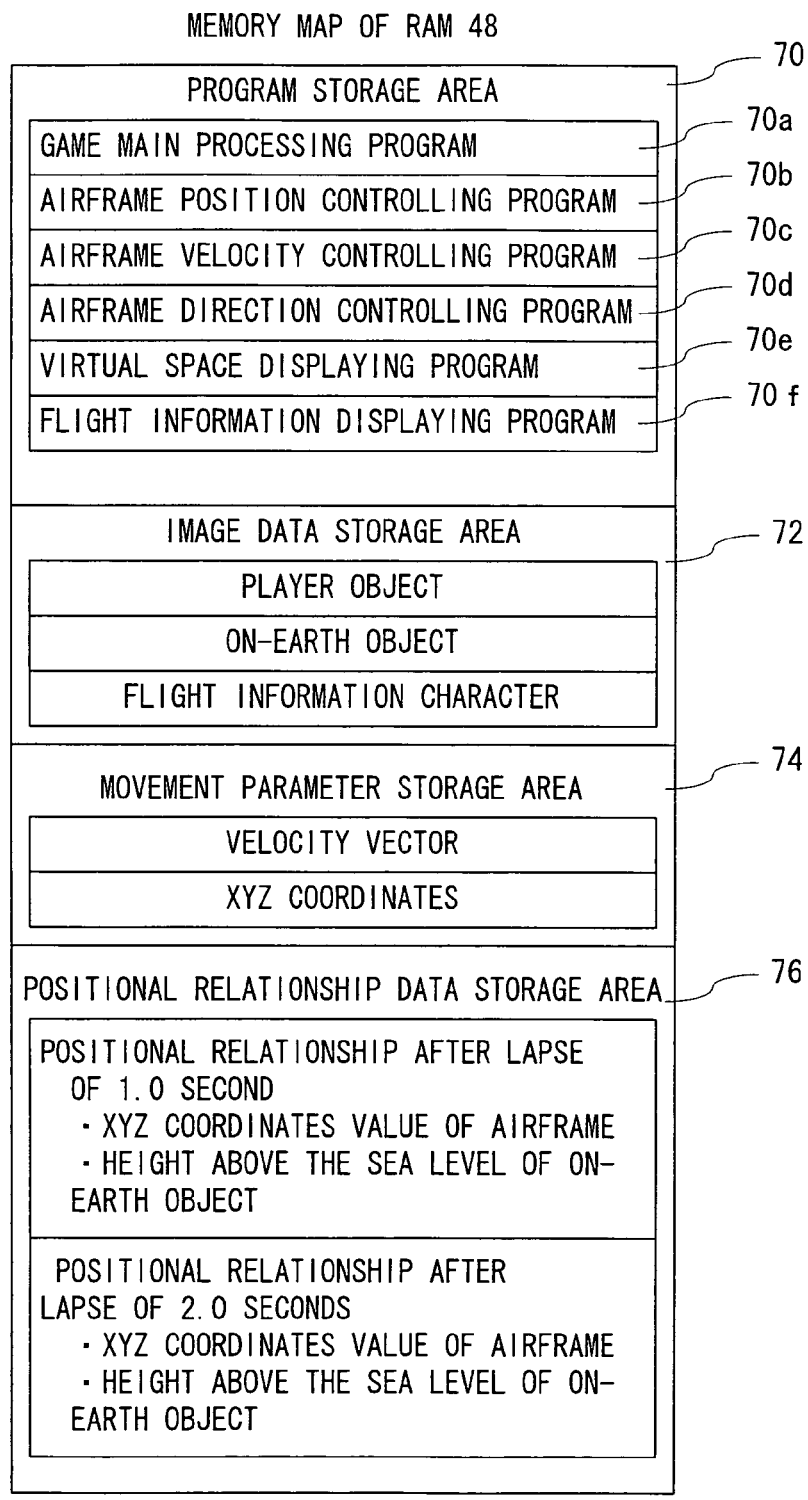
FIG. 3 is an illustrative view showing one example of a memory map of a RAM 48 shown in FIG. 2.

FIG. 3 shows one example of a memory map of the RAM 48. The RAM 48 includes a game program storage area 70. In the game program storage area 70, a game program is loaded from the ROM 28a of the memory card 28. The game program in this embodiment includes a game main processing program 70a, an airframe position controlling program 70b, an airframe velocity controlling program 70c, an airframe direction controlling program 70d, a virtual space displaying program 70e, a flight information displaying program 70f, etc.

Figure 4:
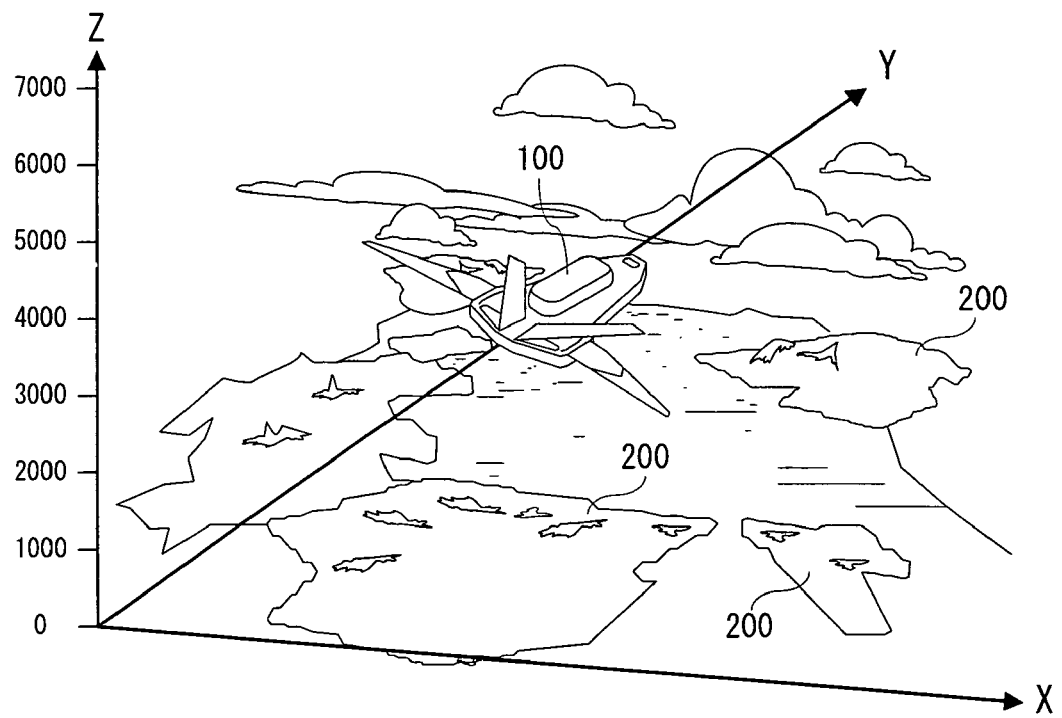
FIG. 4 is an illustrative view showing a manner in which a flying object moves in a virtual game space.

The game main processing program 70a is a program for executing a game main process in this embodiment. Referring to FIG. 4, the game is a combat flight simulation game in which a flying object (player object) 100 taking a shape of an airframe of the fighter moves in the virtual game space according to a key operation by the player. The virtual game space is a three dimensional space (virtual XYZ space) formed by an X axis, a Y axis, and a Z axis. To the Z axis is assigned a scale to define a height above the sea level 0 m-7000 m, and an XY plane is formed at a position corresponding to 0 m of altitude above the sea level, that is, at sea level. Although illustration is omitted, enemy and friend combat planes appear in the virtual game space.

Arranged in the XY-plane are a plurality of on-earth objects 200, 200, . . . taking a shape of a ground, a mountain, a building, an iceberg, a shipping, etc. Here, the enemy and friend combat planes placed on the earth are distinguished from the on-earth object 200. The player performs a key operation such that the flying object 100 does not crash into the on-earth object 200. The main processing of such a combat flight simulation game is executed by the game main processing program 70a.

The airframe position controlling program 70b is a program to control a position of the flying object 100. The movement of the flying object 100 is defined by a current position represented by the XYZ coordinates and a velocity vector represented on the second time scale. An update cycle of one frame image to be displayed on the LCD 12 is 1/60 second. Accordingly, the current position is updated according to the equation 1 every frame update timing.

$$(Cx, Cy, Cz) = (Cx, Cy, Cz) + (Vx, Vy, Vz) * 1/60 \text{ second} \quad \text{[Equation 1]}$$

Cx,Cy,Cz: current position
Vx,Vy,Vz: velocity vector

According to the equation 1, the X coordinate Cx defining the current position is added to the multiplied value obtained by multiplying an X axis component Vx of the velocity vector by "1/60". The Y coordinate Cy defining the current position is added to the multiplied value obtained by multiplying the Y axis component Vy of the velocity vector by "1/60". In addition, the Z coordinate Cz defining the current position is added to the multiplied value obtained by multiplying the Z axis component Vz of the velocity vector by "1/60". Thus, the X coordinate Cx, the Y coordinate Cy, and the Z coordinate Cz defining the current position are updated.

The airframe velocity controlling program 70c is a program to control the movement speed of the flying object 100, that is, the length of the velocity vector. Depressing the action switch 20R once increases the length of the velocity vector by ΔLG1 in order to accelerate the flying object 100. Depressing the action switch 20L once decreases the length of the velocity vector by ΔLG1 in order to decelerate the flying object 100. Continuously depressing the action switch 20R twice increases the length of the velocity vector by ΔLG2(>ΔLG1) in order to abruptly accelerate the flying object 100. Continuously depressing the action switch 20L twice decreases the length of the velocity vector by ΔLG2 in order to abruptly decelerate the flying object 200. It should be noted that when the switch operation is canceled, or when both of the action switches 20R and 20L are simultaneously depressed, the length of the velocity vector is restored to a reference value LGref.

It should be noted that the reference value LGref is equal to 1000 km/h. Also, ΔLG1 is equal to 300 km/h, and ΔLG2 is equal to 700 km/h.

Figure 5:
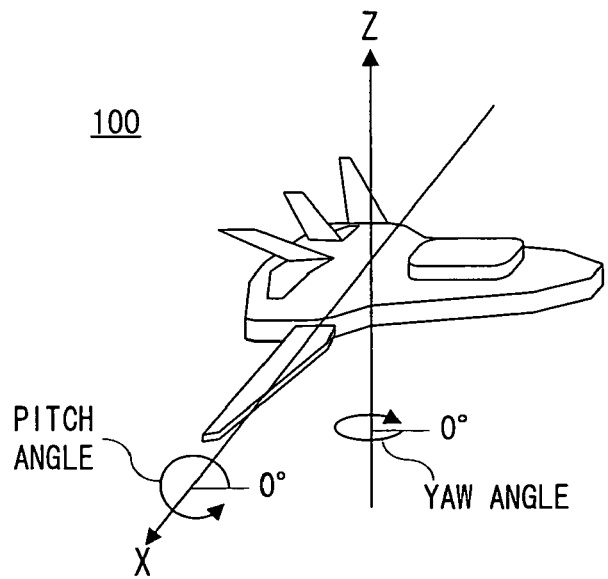
FIG. 5 is an illustrative view showing a yaw angle and a pitch angle to define a trim of the flying object.

The airframe direction controlling program 70d is a program to control a moving direction of the flying object 100, that is, a direction of the movement vector (velocity vector). Referring to FIG. 5, the direction of the flying object 100 is defined by a yaw angle and a pitch angle. The yaw angle is an angle in a rotating direction around the Z axis, and the pitch angle is an angle in a rotating direction around the X axis. In this embodiment, when either the yaw angle or the pitch angle is 0°, the flying object faces due north. When the direction instructing switch 20*a* is upwardly operated, the direction of the velocity vector is updated such that the pitch angle is decreased. When the direction instructing switch 20*a* is downwardly operated, the direction of the velocity vector is updated such that the pitch angle is increased. When the direction instructing switch 20*a* is leftward operated, the direction of the velocity vector is updated such that the yaw angle is decreased. When the direction instructing switch 20*a* is rightward operated, the direction of the velocity vector is updated such that the yaw angle is increased.

Figure 6:
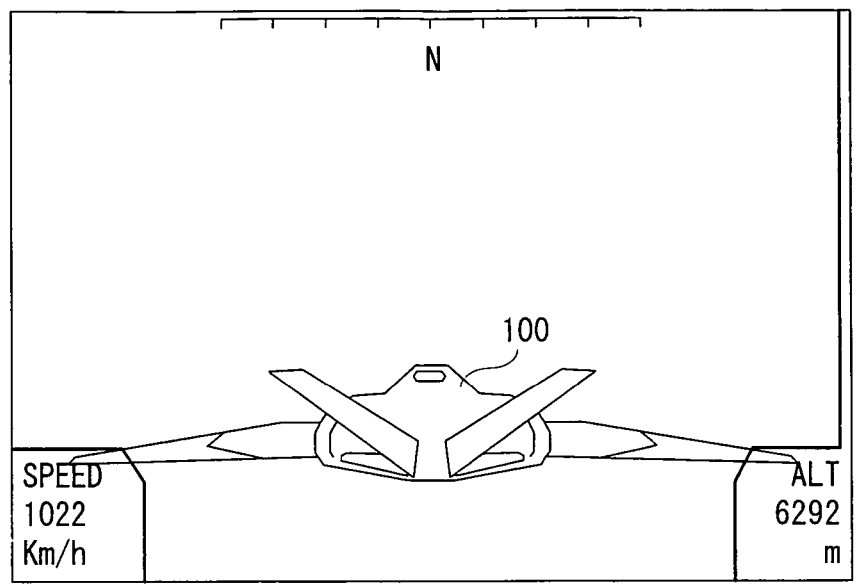
FIG. 6 is an illustrative view showing one example of a game screen to be displayed on an LCD 12.
Figure 7:
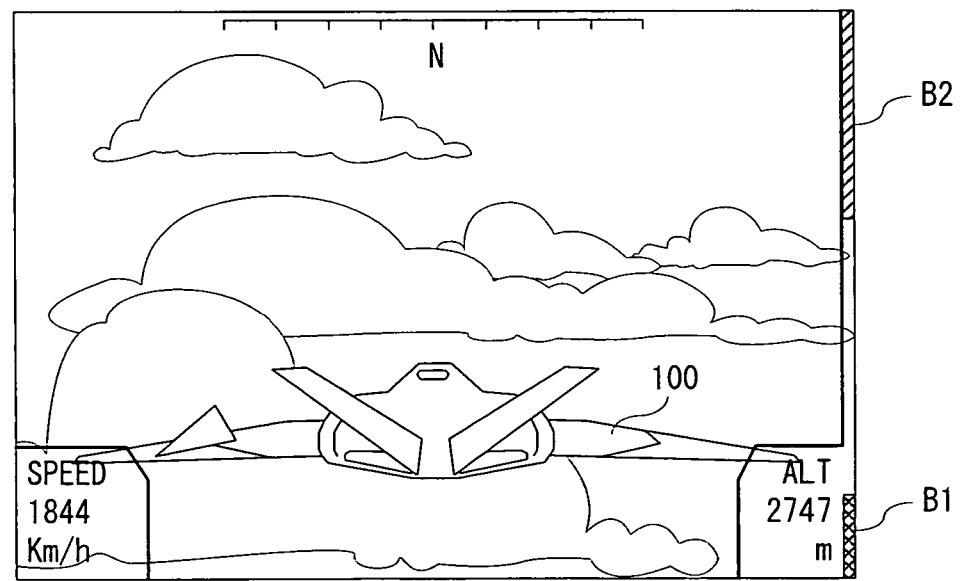
FIG. 7 is an illustrative view showing another example of a game screen to be displayed on the LCD 12.
Figure 8:
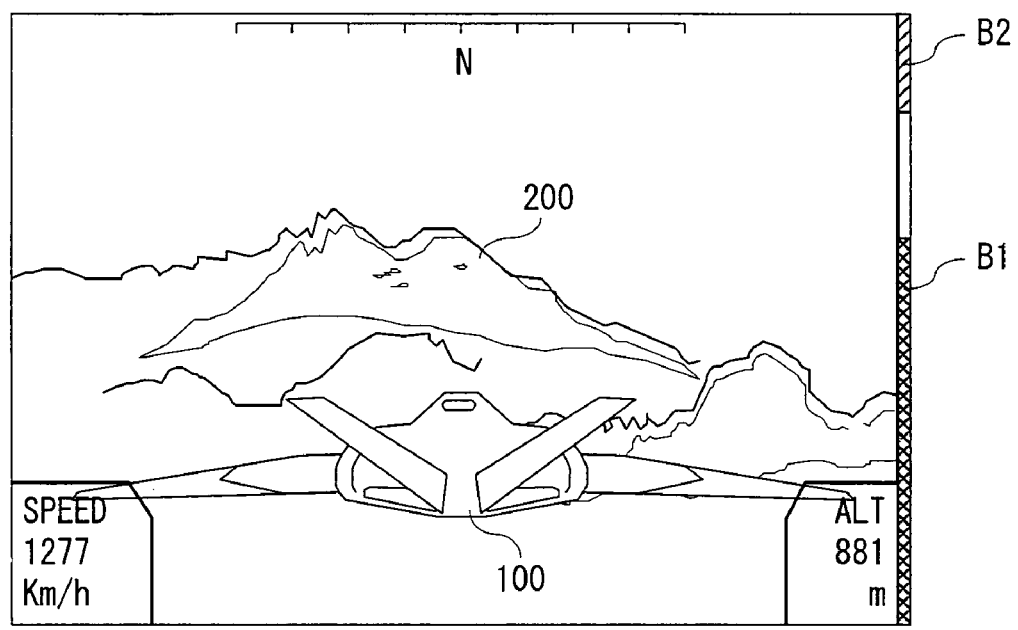
FIG. 8 is an illustrative view showing the other example of the game screen to be displayed on the LCD 12.

The virtual space displaying program 70*e* is a program to display the virtual game space and the flying object 100 on the LCD 12 from a viewpoint of capturing the flying object 100 backward. The virtual space displaying program 70*e* is to display on the entire screen a view defined by a current position and a current velocity vector of the flying object 100 every frame update timing, and display the back of the flying object 100 on the middle of the screen. The virtual game space and the flying object 100 are reproduced on the LCD 12 from a viewpoint of capturing a head of the flying object 100 as shown in FIG. 6, FIG. 7 or FIG. 8.

The flight information displaying program 70*f* is a program to inform the player of a flying condition of the flying object 100. When the frame update timing has come, the current position and velocity vector of the flying object 100 are detected, and on the basis of these, the altitude of the airframe (corresponding to the Z coordinate), the airframe velocity (corresponding to the length of the velocity vector), and a bearing (corresponding to the direction of the velocity vector) are displayed on the LCD 12. As shown in FIG. 6, FIG. 7, or FIG. 8, the altitude of the airframe is displayed in the lower right portion of the screen as "ALT**m" (**: a numerical value indicating an altitude), and the airframe velocity is displayed in the lower left portion of the screen as "SPEED####km/h" (####: a numerical value indicating km/h). A character showing a bearing (N, E, W or S) is displayed in the upper portion of the screen.

When the altitude of the airframe is below 5000 m, the XYZ coordinates where the flying object 100 will reach after the lapse of 1.0 second or 2.0 seconds is predicted according to the Equation 2.

$$(Fx, Fy, Fz) = (Cx, Cy, Cz) + (Vx, Vy, Vz) * T \text{ second} \quad \text{[Equation 2]}$$

T: 1.0 or 2.0
Fx,Fy,Fz: predicted reaching position

According to the Equation 2, the X coordinate Cx defining the current position is added to the multiplied value obtained by multiplying the X axis component Vx of the velocity vector by "T". Also, the Y coordinate Cy defining the current position is added to the multiplied value obtained by multiplying the Y axis component Vy of the velocity vector by "T". In addition, the Z coordinate Cz defining the current position is added to the multiplied value obtained by multiplying the Z axis component Vz of the velocity vector by "T". Thus, the X coordinate Fx, the Y coordinate Fy, and the Z coordinate Fz defining each of the predicted reaching positions after a lapse of 1.0 second and 2.0 seconds are obtained.

Succeedingly, detected is the height above the sea level of the on-earth object 200 in each of the two XY coordinates to be predicted according to the arithmetic operation of the Equation 2. In addition, calculated are the distance from the altitude of the flying object 100 after a lapse of 1.0 second to the on-earth object 200 existing directly below, and the distance from the altitude of the flying object after a lapse of 2.0 seconds to the on-earth object 200 existing directly below. The distance to be calculated indicates a numerical value obtained by subtracting the height above the sea level of the on-earth object 200 from the altitude of the flying object 100.

Figure 9:
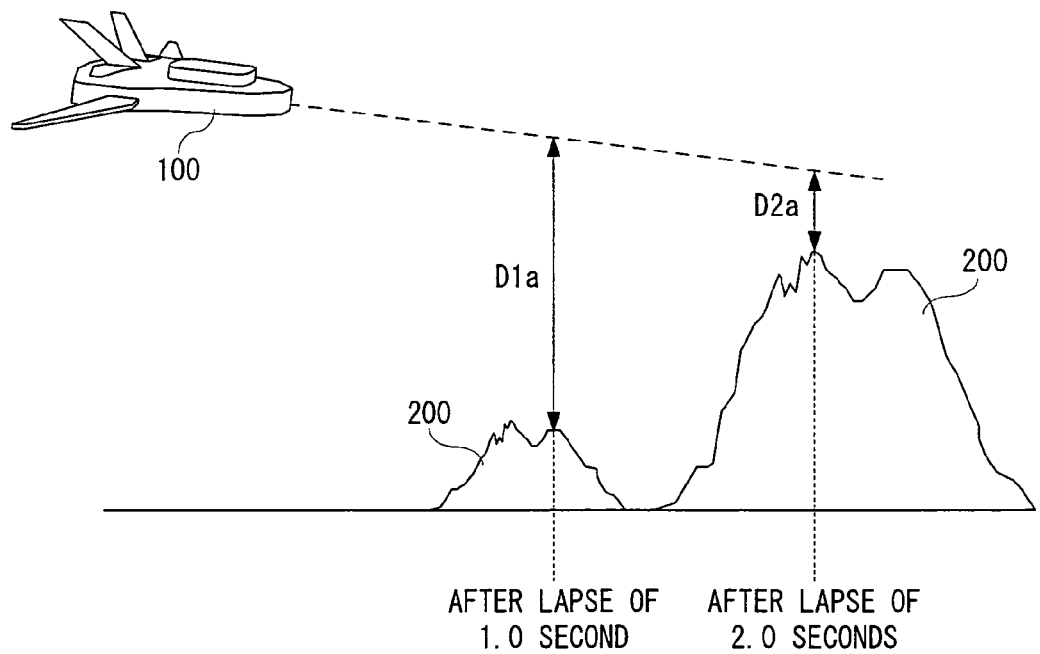
FIG. 9(A) is an illustrative view showing one example of a distance from a flying object to an on-earth object in a predicted reaching position of the flying object.
FIG. 9(B) is an illustrative view showing another example of the distance from the flying object to the on-earth object in the predicted reaching position of the flying object.
Figure 9:
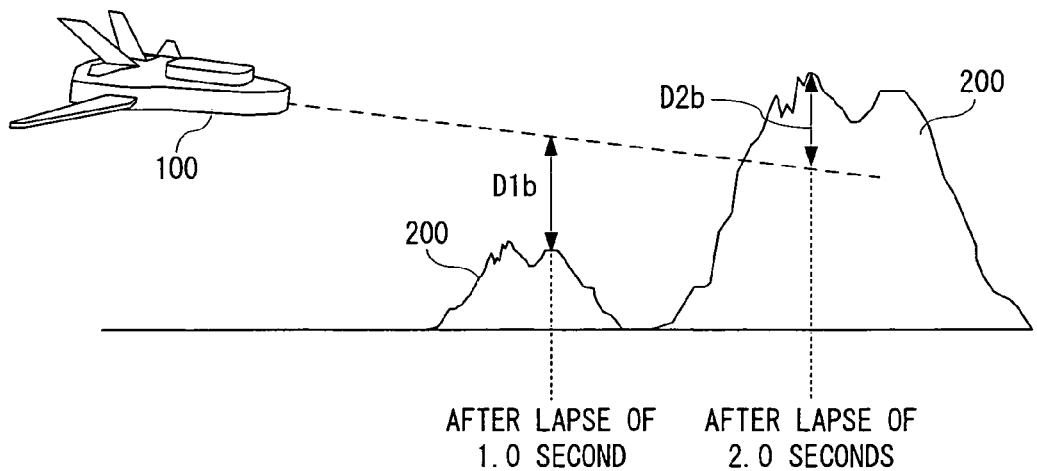

In a case that the flying object 100 flies in manner shown in FIG. 9(A), "D1*a*" is calculated as the distance from the flying object 100 to the on-earth object 200 after a lapse of 1.0 second, and "D2*a*" is calculated as the distance from the flying object 100 to the on-earth object 200 after a lapse of 2.0 seconds. Also, in a case that the flying object 100 flies in manner shown in FIG. 9(B), "D1*b*" is calculated as the distance from the flying object 100 to the on-earth object 200 after a lapse of 1.0 second, and "D2*b*" is calculated as the distance from the flying object 100 to the on-earth object 200 after a lapse of 2.0 seconds. According to FIG. 9(B), the altitude of the flying object 100 after a lapse of 2.0 seconds is lower than the height above the sea level of the on-earth object 200. Thus, the distance D2*b* is a negative numerical value.

After the two distances are thus calculated, the following process is executed focusing on the shortest distance (the distance having the smallest numerical value, and the distance Db2 in both FIG. 9(A) and FIG. 9(B)). The bar scale for displaying an on-earth object height bar B 1 and an airframe altitude bar B2 is set to 5000 m when the altitude of the airframe defining the shortest distance is equal to or more than 1000 m while it is set to 1000 m when the altitude of the airframe defining the shortest distance is less than 1000 m.

The on-earth object height bar B1 and the airframe altitude bar B2 are displayed in a manner shown in FIG. 7 when the bar scale is 5000 m, and displayed in a manner shown in FIG. 8 when the bar scale is 1000 m. The on-earth object height bar B1 extends from the lower right-hand corner to the upper of the screen, and the airframe altitude bar B2 extends from the upper right-hand corner to the lower of the screen. The upper edge position of the on-earth object height bar B1 corresponds to the height above the sea level of the on-earth object 200, and the lower edge position of the airframe altitude bar B2 corresponds to the altitude of the flying object 100. Accordingly, the contact of the lower edge of the airframe altitude bar B2 with the upper edge of the on-earth object height bar B1 means a collision of the flying object 100 with the on-earth object 200.

The on-earth object height bar B1 is displayed in red (RGB: 255, 0, 0), and the airframe altitude bar B2 is displayed in green (RGB: 0, 255, 0). Furthermore, the width of each of the on-earth object height bar B1 and the airframe altitude bar B2 corresponds to 8 pixels. The on-earth object height bar B1 and the airframe altitude bar B2 thus displayed forms difference information indicating a difference between the altitude of the flying object 100 and the height above the sea level of the on-earth object 200.

In displaying the on-earth object height bar B1, the length of the on-earth object height bar B1 is defined by use of a Log (logarithm) in view of difficulty in representing an altitude from 0 to high altitude on the smaller LCD 12. For example, if the length of the on-earth object height bar B1 corresponding to the on-earth object with 100 m of the height above the sea level is represented by 32 dots, the length of the on-earth object height bar B1 corresponding to the on-earth object with 1000 m of the height above the sea level is not 320 dots but 96 dots. It should be noted that the base of Log may be changed as necessary.

The color of the displayed airframe altitude bar B2 is changed from green to red when the missile launched from an enemy combat plane rocks on the flying object 100. Also, while the flying object 100 is being bombed, while the flying object 100 is abruptly accelerating, or while the flying object 100 is abruptly decelerating, the airframe altitude bar B2 vibrates in a horizontal direction. Here, five minutes from a point past 0.5 second from the missile being crashed into the flying object 100 is defined as "a being bombed state". It should be noted that the width of vibration in the being bombed state is up to 4 pixels, and the width of vibration during abrupt acceleration or during abrupt deceleration is up to 2 pixels.

Furthermore, the displayed airframe altitude bar B2 flashes 2.5 times per second when the noted shortest distance is equal to or less than 200 m and is above 0 m (see FIG. 9(A)), and the displayed airframe altitude bar B2 flashes 7.5 times per second when the noted shortest distance is equal to or less than 0 m (see FIG. 9(B)). Also, if the noted shortest distance is equal to or less than 200 m, a warning message of "PULL UP" is displayed on the screen.

The flashing of 2.5 times per second allows the player to know that the flying object 100 is in the warning altitude. The flashing of 7.5 times per second allows the player to know that the flying object 100 crashes by 2.0 seconds at the latest. It should be noted that the "flashing" is a process to change the color of the airframe altitude bar B2 between red and green, that is, is a blinking-display process to alternately turn into red and green every unit of time.

The flight information displaying program 70$f$ is thus executed to reduce difficulty when the player operates the flying object 100.

It should be noted that in the game program storage area 70, although illustration is omitted, various programs required to progress the game such as a program to generate and output a game music or game sound, etc. are stored. For example, when the shortest distance is equal to or less than 200 m as described above, beep tones may be generated. In this case, a program to generate and output the beep tones is stored.

Furthermore, the memory map of the RAM 48 includes a data storage area, and stored in the data storage area are the data loaded from the ROM 28$a$ or the RAM 28$b$ of the memory card 28, the data generated in correspondence with the game process, or the like. The data storage area includes an image data storage area 72, a movement parameter storage area 74, a positional relationship storage area 76, etc.

Stored in the image data storage area 72 is image data to generate a game image. For example, image data, such as the flying object 100, the on-earth object 200, the flying information character, other objects, and the map data of the on-earth object 200 (including height above the sea level of the on-earth object 200).

Stored in the movement parameter storage area 74 is the operation parameter (movement parameter) of the flying object 100 defined by the airframe position controlling program 70$b$, the airframe velocity controlling program 70$c$, and the airframe direction controlling program 70$d$. More specifically, the XYZ coordinates indicating the current position of the flying object 100 and the current velocity vector are stored as the operation parameter.

Stored in the positional relationship storage area 76 is data as to the positional relationship of the two points calculated by the flight information displaying program 70$f$. More specifically, the XYZ coordinates of the position where the flying object 100 will reach after a lapse of 1.0 second and the height above the sea level of the on-earth object in the X and Y coordinates defining the reaching position are stored as positional relationship data after a lapse of 1.0 second. Also, the XYZ coordinates of the position where the flying object 100 will reach after a lapse of 2.0 seconds and the height above the sea level of the on-earth object in the X and Y coordinates in the reaching position are stored as the positional relationship data after a lapse of 2.0 seconds.

It should be noted that in the data storage area, although illustration is omitted, other game data (including a flag and a counter), etc. generated in correspondence with the progress of the game are stored.

Figure 10:
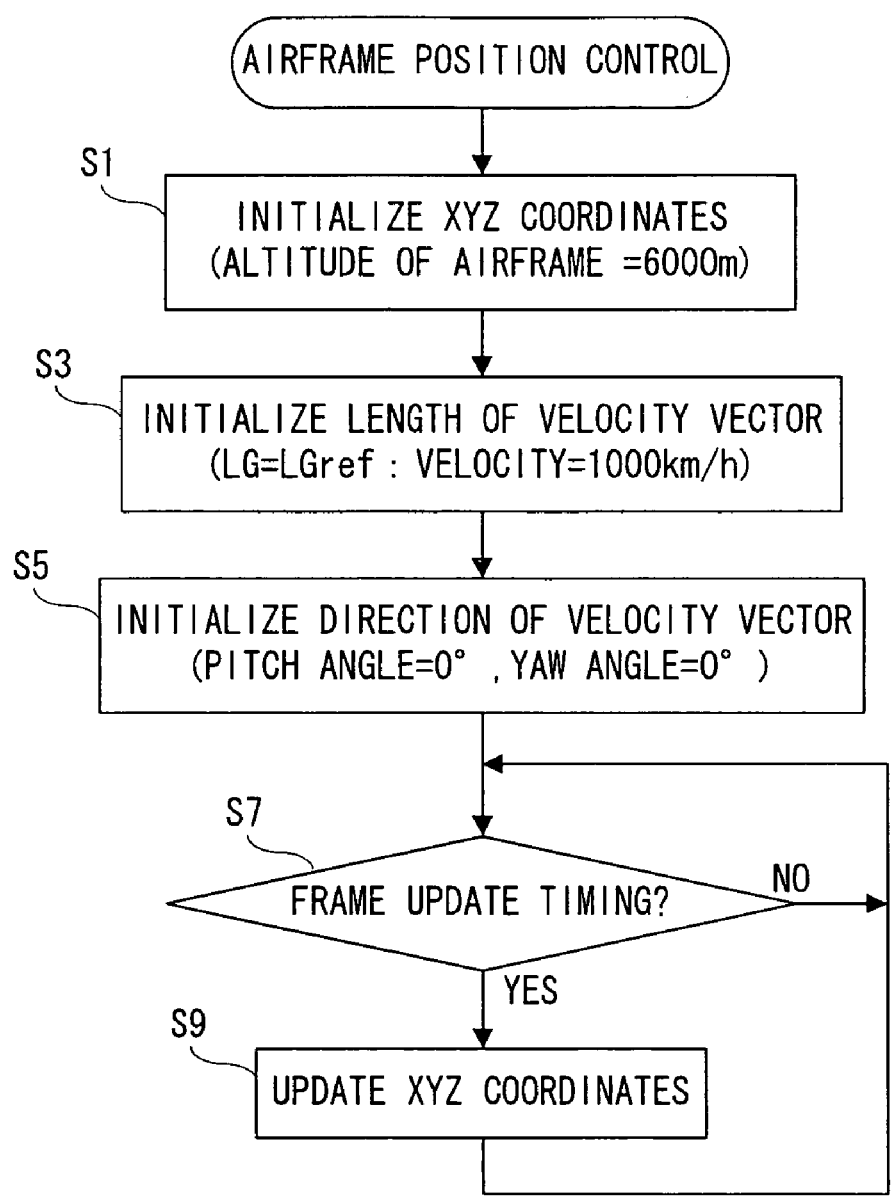
FIG. 10 is a flowchart showing one example of a process according to an airframe position controlling program.

A process of the airframe position controlling program 70$b$ is described with referring to FIG. 10. First, initialized in a step S1 is the XYZ coordinates indicating the current position of the flying object 100. The initialized Z coordinate indicates a value corresponding to 6000 m of the height above the sea level. Initialized in steps S3 and S5 is the velocity vector of the flying object 100. The length of the velocity vector is set to an initial value LGref corresponding to 1000 km/h. The direction of the velocity vector is set to a direction corresponding to pitch angle=yaw angle=0°. The initialized XYZ coordinates and velocity vector are written to the movement parameter storage area 74. In a step S7, it is determined whether or not the frame update timing has come. If "YES" here, the process proceeds to a step S9 to update the XYZ coordinates stored in the movement parameter storage area 74 according to the above-described Equation 1. After completion of the updating process, the process returns to the step S7.

Figure 11:
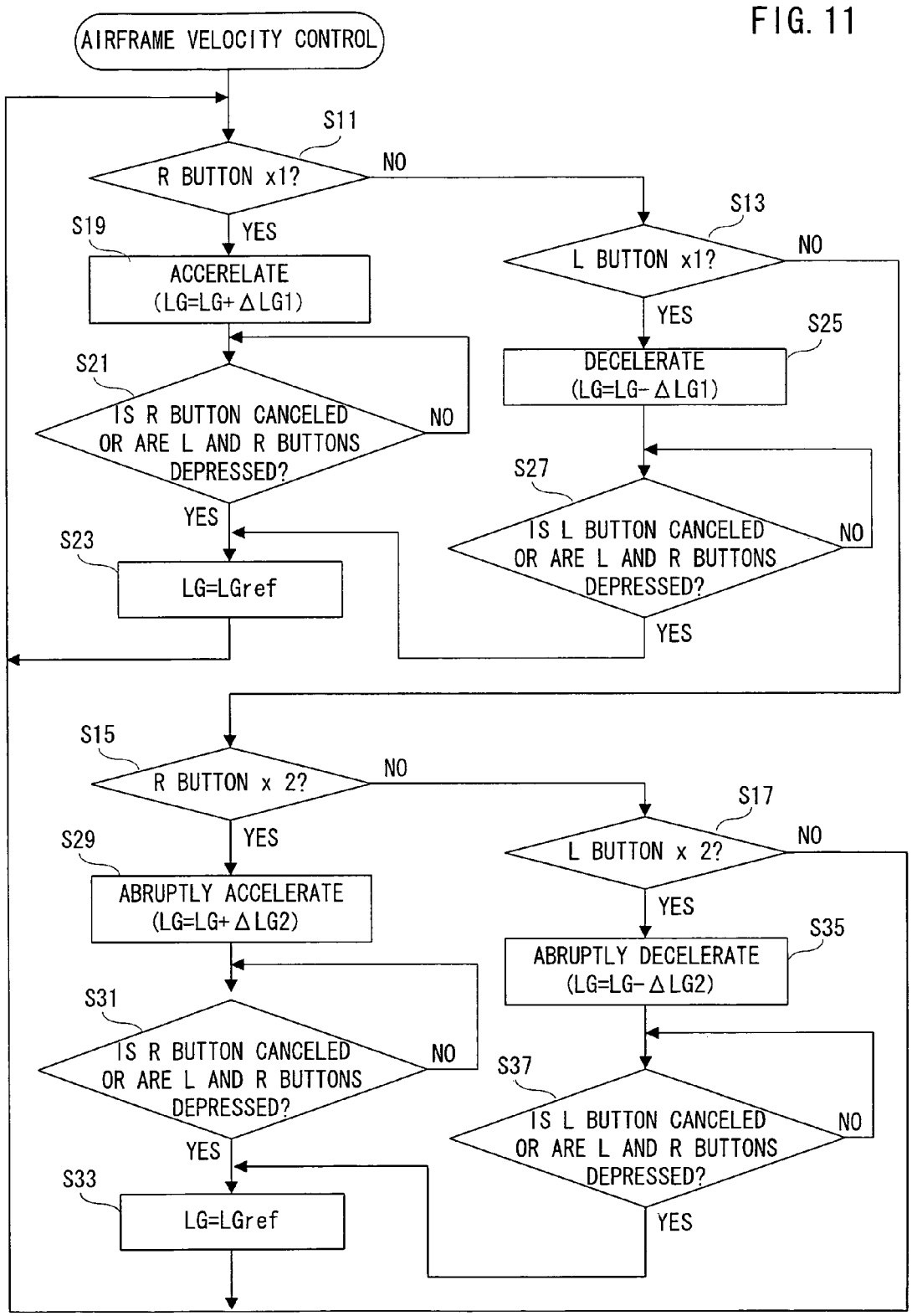
FIG. 11 is a flowchart showing one example of a process according to an airframe velocity controlling program.

A process of the airframe velocity controlling program 70$c$ is described with referring to FIG. 11. In a step S11, it is determined whether or not the action switch 20R is depressed once, and in a step S13, it is determined whether or not the action switch 20L is depressed once. In a step S15, it is determined whether or not the action switch 20R is depressed successive twice, and in a step S17, it is determined whether or not the action switch 20L is depressed successive twice.

If "YES" is determined in the step S11, the process proceeds to a step S19 to increase the length of the velocity vector stored in the movement parameter storage area 74 by ΔLG1. Thus, the flying object 100 is accelerated. If the depression of the action switch 20R is canceled, or if the action switches 20L and 20R are simultaneously depressed, the process proceeds from a step S21 to a step S23 to return the length of the velocity vector stored in the movement parameter storage area 74 to the initial value LGref. After completion of the process in the step S23, the process returns to the step S11.

If "YES" is determined in the step S13, the process proceeds to a step S25 to decrease the length of the velocity vector stored in the movement parameter storage area 74 by ΔLG1. Thus, the flying object 100 is decelerated. If the depression of the action switch 20L is canceled, or if the action switches 20L and 20R are simultaneously depressed, "YES" is determined in a step S27, and the process returns to the step S11 through the process in the step S23.

If "YES" is determined in the step S15, the process proceeds to a step S29 to increase the length of the velocity vector stored in the movement parameter storage area 74 by ΔLG2. Thus, the flying object 100 is abruptly accelerated (afterburner). If the depression of the action switch 20R is canceled or if the action switches 20L and 20R are simultaneously depressed, the process proceeds to a step S33 from the step S31 to return the length of the velocity vector stored in the movement parameter storage area 74 to the initial value LGref. After the completion of the process in the step S33, the process returns to the step S11.

If "YES" is determined in the step S17, the process proceeds to a step S35 to decrease the length of the velocity vector stored in the movement parameter storage area 74 by ΔLG2. Thus, the flying object 100 is abruptly decelerated (hard brake). If the depression of the action switch 20L is canceled, or if the action switches 20L and 20R are simultaneously depressed, "YES" is determined in a step S37, and the process returns to the step S11 through the process in the step S33.

Figure 12:
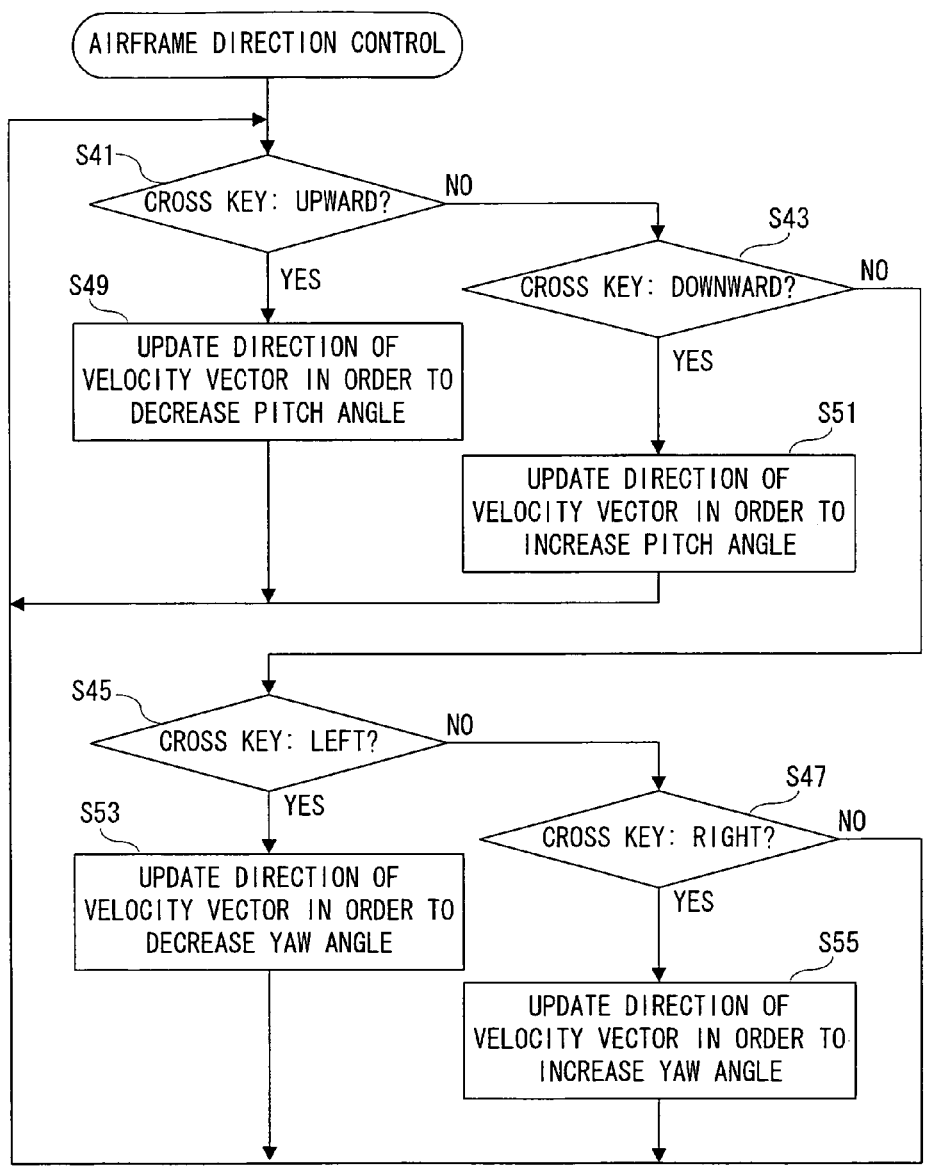
FIG. 12 is a flowchart showing one example of a process according to an airframe direction controlling program.

A process of the airframe direction controlling program 70d is described with referring to FIG. 12. It is determined whether or not the direction instructing switch 20a is upwardly operated in a step S41, and it is determined whether or not the direction instructing switch 20a is downwardly operated in a step S43. Furthermore, it is determined whether or not the direction instructing switch 20a is leftward operated in a step S45, and it is determined whether or not the direction instructing switch 20a is rightward operated in a step S47.

If "YES" is determined in the step S41, the process proceeds to a step S49 to update the direction of the velocity vector such that the pitch angle is decreased. If "YES" is determined in the step S43, the process proceeds to a step S51 to update the direction of the velocity vector such that the pitch angle is increased. If "YES" is determined in the step S45, the process proceeds to a step S53 to update the direction of the velocity vector such that the yaw angle is decreased. If "YES" is determined in the step S47, the process proceeds to a step S55 to update the direction of the velocity vector such that the yaw angle is increased. After completion of the process in the steps S49, S51, S53, or S55, the process returns to the step S41.

Figure 13:
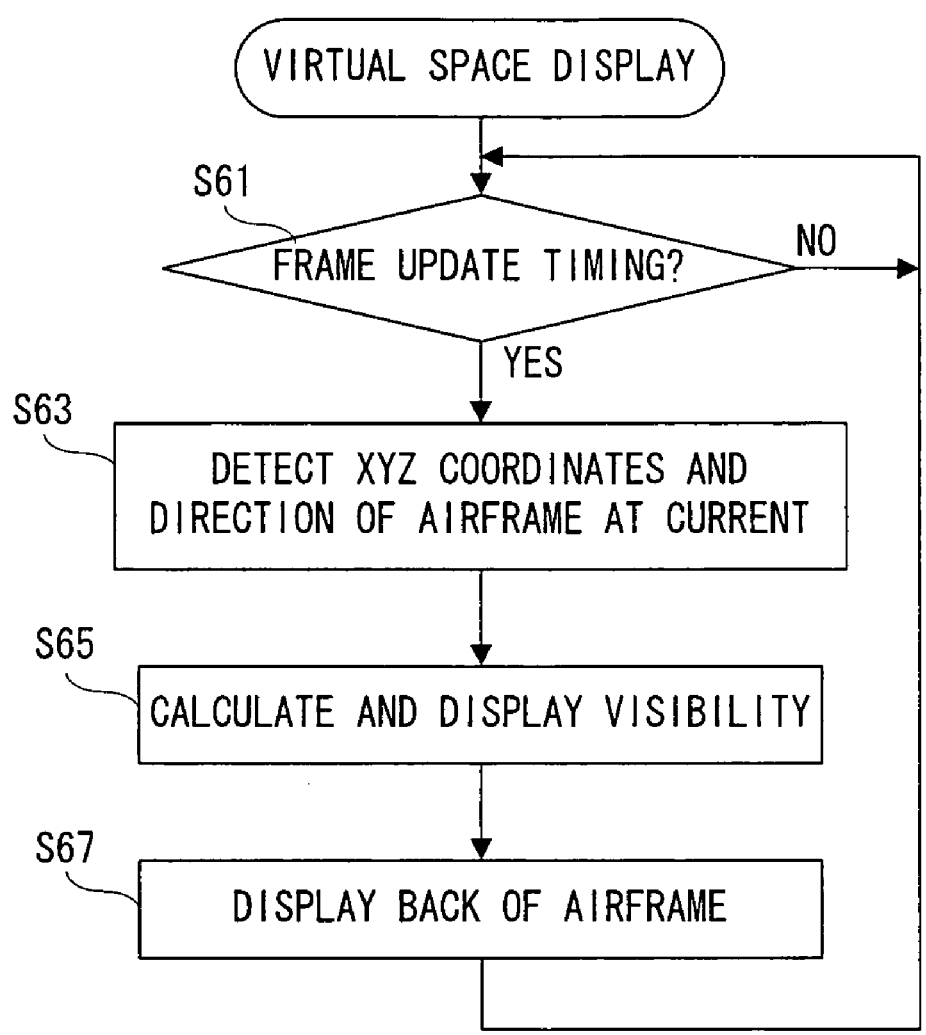
FIG. 13 is a flowchart showing one example of a process according to a virtual space displaying program.

A process in the virtual space displaying program 70e is described with referring to FIG. 13. It is determined whether or not the frame update timing has come in a step S61, and if "YES", the process proceeds to a step S63. In the step S63, the XYZ coordinates and the moving direction of the flying object 100 are detected with referring to the movement parameter storage area 74. Calculated in a step S65 is a view specified by the detected XYZ coordinates and moving direction, and an image representing the calculated view is displayed on a whole screen of the LCD 12. In a step S67, the back of the flying object 100 is displayed on the center of the LCD 12. The virtual game space and the flying object 100 are reproduced on the LCD 12 from a viewpoint of capturing ahead of the flying object 100 (see FIG. 6, FIG. 7, or FIG. 8). After completion of the process in the step S67, the process returns to the step S61. It should be noted that the process in the step S67 may not be performed. That is, a view capturing ahead of the flying object 100 from the cockpit may be reproduced and displayed without displaying the back of the flying object 100.

Figure 14:
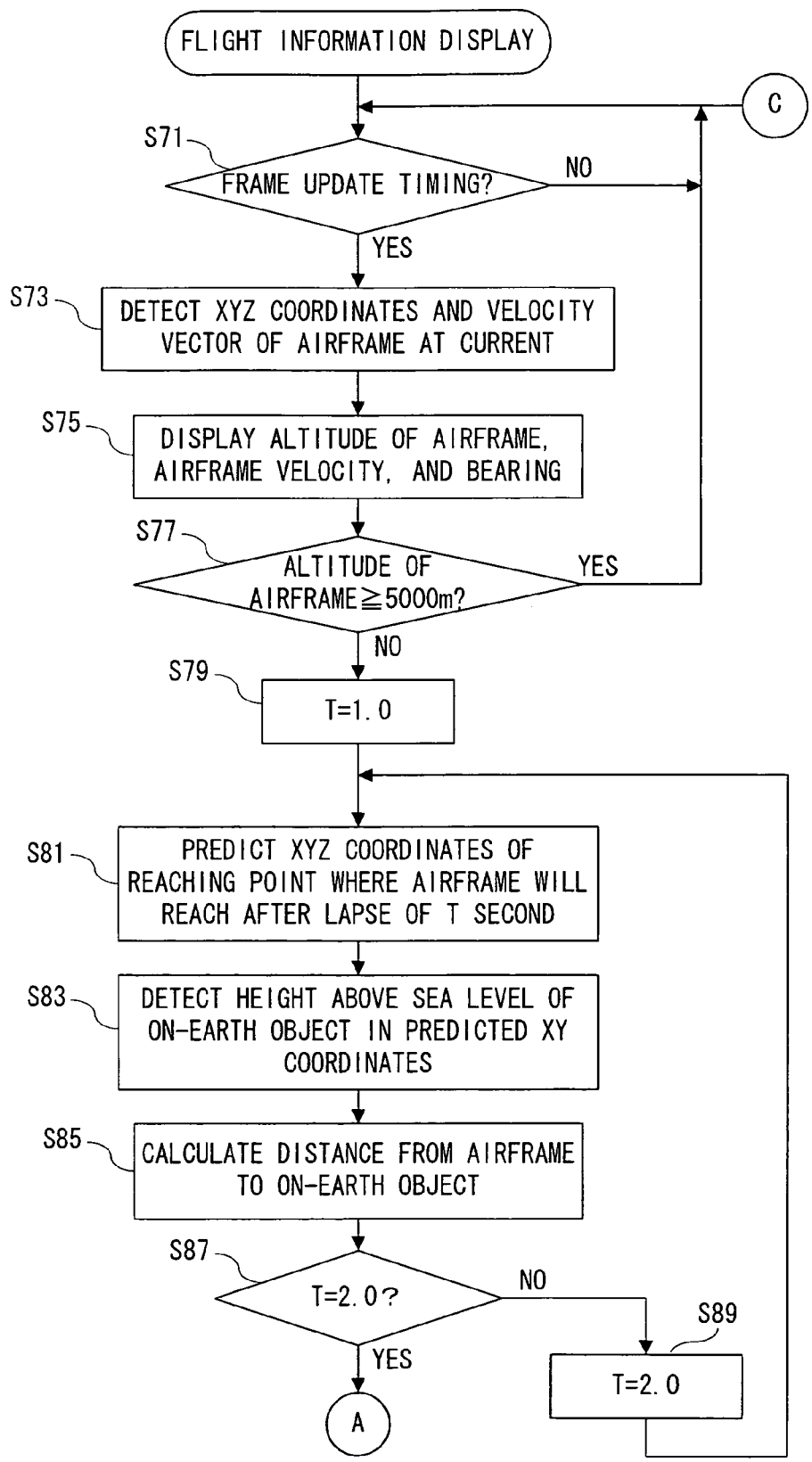
FIG. 14 is a flowchart showing a part of a process according to a flight information displaying program.
Figure 15:
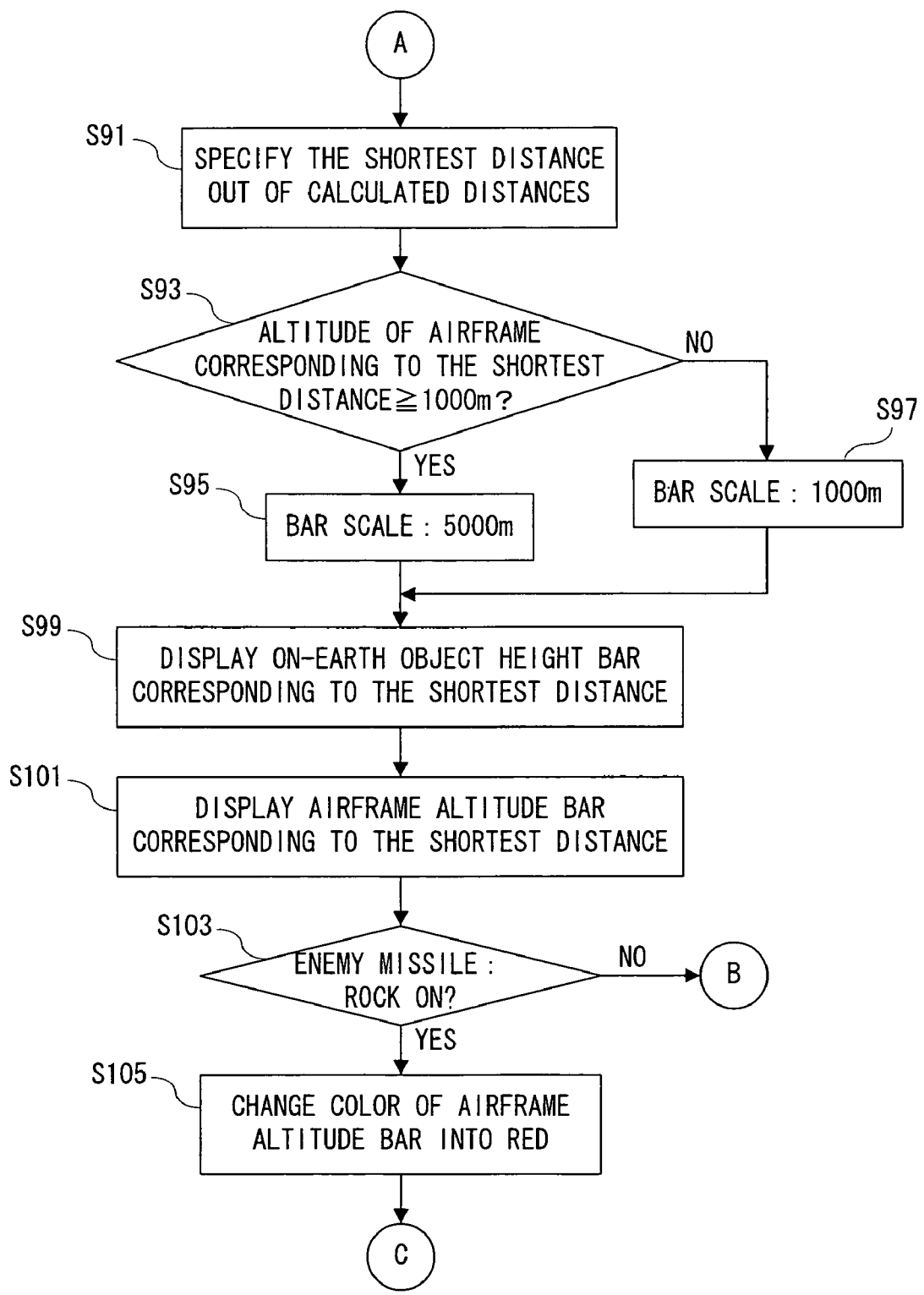
FIG. 15 is a flowchart showing another part of the process according to the flight information displaying program.
Figure 16:
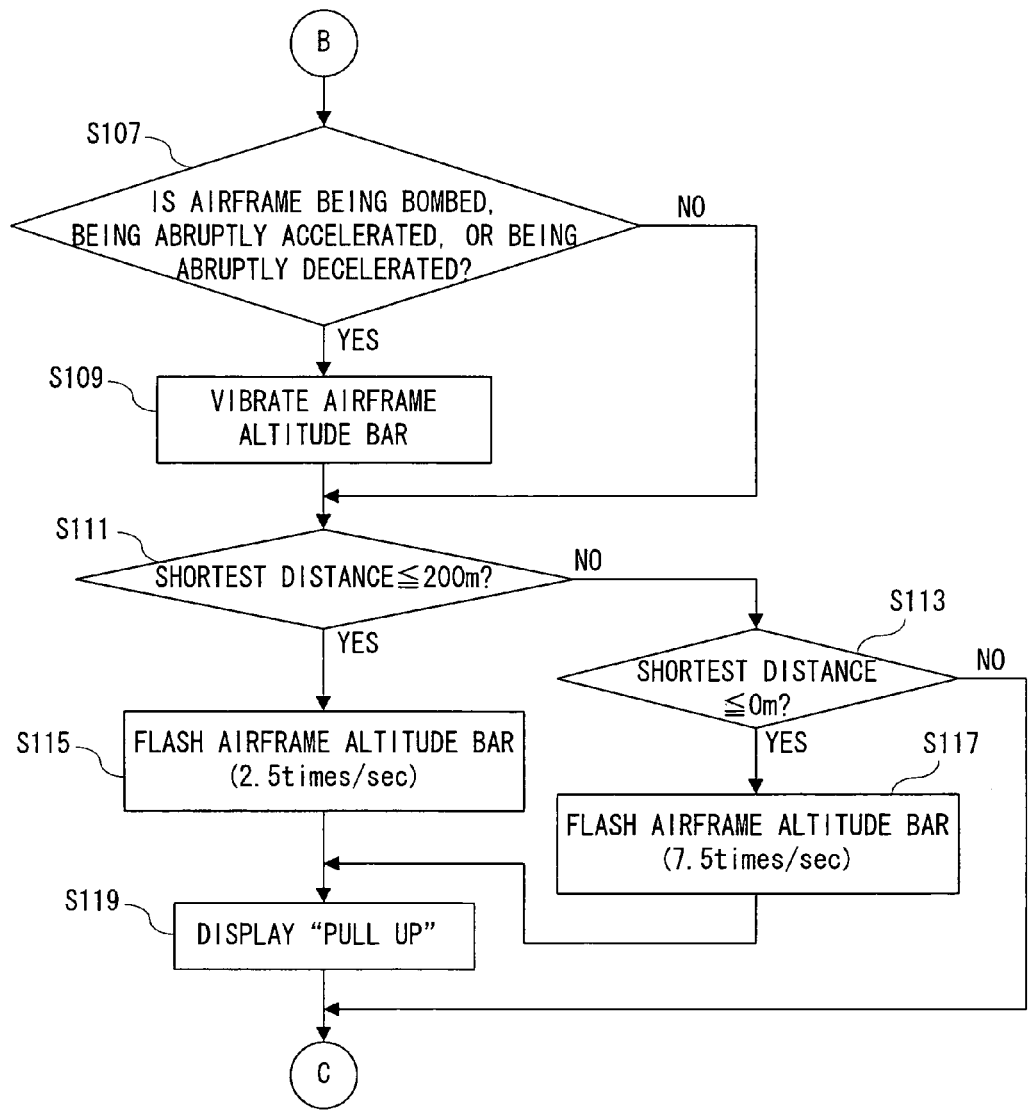
FIG. 16 is a flowchart showing the other part of the process according to the flight information displaying program.

A process of the flight information displaying program 70f is described with reference to FIG. 14. When the frame update timing has come, the process proceeds to a step S73 from a step S71 to detect the current XYZ coordinates and velocity vector of the flying object 100 from the movement parameter storage area 74. In a step S75, the altitude of the airframe, the airframe velocity, and the bearing are displayed on the LCD 12 on the basis of the detected XYZ coordinates and velocity vector in a manner shown in FIG. 6, FIG. 7, or FIG. 8.

In a step S77, it is determined whether or not the altitude of the airframe is equal to or more than 5000 m, and if "YES", the process returns to the step S71 while if "NO", the process proceeds to a step S79. In the step S79, the variable T is set to "1.0", and in a succeeding step S81, the XYZ coordinates of the reaching point where the flying object 100 will reach after a lapse of T second are calculated according to the above-described Equation 2.

Detected in a step S83 is the height above the sea level of the on-earth object 200 in the X and Y coordinates predicted in the step S81. In detecting the height above the sea level, the map data stored in the image data storage area 72 is referred. Calculated in a step S85 is the distance from the flying object 100 to the on-earth object 200 in the X and Y coordinates predicted in the step S81. The calculated distance is obtained by subtracting the height above the sea level detected in the step S83 from the Z coordinate predicted in the step S81.

In a step S87, it is determined whether or not the variable T indicates "2.0". If "NO" here, the variable T is set to "2.0" in a step S89, and the process in the steps S81-S85 is executed again. Thus, the distance from the flying object 100 to the on-earth object 200 is obtained as to each of the points where the flying object 100 will reach after a lapse of 1.0 second and after a lapse of 2.0 seconds.

If "YES" is determined in the step S87, the process proceeds to a step S91 to specify the shortest distance (distance having the smallest numerical value) out of the calculated two distances. In a step S93, it is determined whether or not the altitude of the airframe (Z coordinate of the flying object 100) defining the specified shortest distance is equal to or more than 1000 m. If "YES" here, the bar scale is set to 5000 m in a step S95 while if "NO", the bar scale is set to 1000 m in a step S97.

Displayed on the LCD 12 in a step S99 is the red on-earth object height bar B1 defining the shortest distance specified in the step S9 1. Displayed on the LCD 12 in a step S101 is the green airframe altitude bar B2 defining the shortest distance specified in the step S91. The on-earth object height bar B1 and airframe altitude bar B2 to be displayed are displayed in the bar scale set in the step S95 or S97 in a manner shown in FIG. 7 or FIG. 8.

As described above, the on-earth object height bar B1 upwardly extends from the lower right of the screen, and the airframe altitude bar B2 downwardly extends from the upper right of the screen. The upper edge position of the on-earth object height bar B1 is equivalent to the height above the sea level of the on-earth object 200, and the lower edge position of the airframe altitude bar B2 is equivalent to the altitude of the flying object 100. The length of the on-earth object height bar B1 is determined by the logarithmic arithmetic. The on-earth object height bar B1 and airframe altitude bar B2 thus displayed form the difference information representing the difference between the altitude of the flying object 100 and the height above the sea level of the on-earth object 200.

In a step S103, it is determined whether or not a missile launched from an enemy combat plane locks on the flying object 100. If "YES" here, the color of the airframe altitude bar B2 is changed into red in a step S105, and then, the process returns to the step S71. On the other hand, if "NO", it is determined whether or not the flying object 100 is in the being bombed state, the flying object 100 is being abruptly accelerated, or the flying object 100 is being abruptly decelerated in a step S107. If it is in neither the being bombed state, the abrupt acceleration state, nor the abrupt deceleration state, the process directly proceeds to a step S111 while if it is in the being bombed state, the abrupt acceleration state, or the abrupt deceleration state, the airframe height bar B2 is vibrated in the horizontal direction in a step S109, and then, the process proceeds to the step S111. It should be noted that as described above, the width of vibration in the being bombed state is larger than the width of vibration in the abrupt acceleration state or the abrupt deceleration state.

In the step S111, it is determined whether or not the shortest distance specified in the step S91 is equal to or less than 200 m. In a step S113, it is determined whether or not the shortest distance specified in the step S91 is equal to or less than 0 m. When the shortest distance is above 200 m, it is determined that the altitude of the airframe has sufficient allowance, and then, the process directly returns to the step S71. When the shortest distance is equal to or less than 200 m and is above 0 m, it is considered that the flying object 100 in the warning altitude, and the process proceeds to a step S115.

If the shortest distance is equal to or less than 0 m, it is considered that the flying object 100 collides with the on-earth object 200 by 2.0 seconds at the latest, and then, the process proceeds to a step S117.

In the step S115, the airframe altitude bar B2 flashes 2.5 times per second. In the step S117, the airframe altitude bar B2 flashes 7.5 times per second. In a step S119 succeeding to the step S115 or S117, the warning message of "PULL UP" is displayed on the LCD 12, and then, the process returns to the step S71.

As can be understood from the above-described description, one or more on-earth objects 200 existing in the virtual game space are reproduced on the LCD 12 from a viewpoint of capturing ahead of the flying object 100 moving in the virtual game space (S65). A velocity parameter defining a moving velocity of the flying object 100 is changed in response to an operation of the operating switches 20R and 20L by the player (S19, S25, S29, S35). A direction parameter defining a moving direction of the flying object 100 is changed in response to an operation of the direction instructing switch 20a by the player (S49, S51, S53, S55). The velocity parameter and the direction parameter define a movement parameter of the flying object 100.

The altitude of the point where the flying object 100 will reach after a lapse of the time T(T>0) is predicted on the basis of the movement parameter of the flying object 100 (S81). The height above the sea level of the on-earth object 200 existing in the predicted point is detected with reference to the map data (S83). The difference information indicating the difference between the detected height above the sea level of the on-earth object 200 and the altitude of the flying object 100 is output to the player via the LCD 12 (S99, S101).

Outputting the difference information indicating the difference between the height above the sea level of the on-earth object 200 existing in the point where the flying object 100 will reach after a lapse of T seconds and the altitude of the flying object 100 makes it possible to ease the difficulty in operating the flying object 100. Especially, in a case that a view capturing ahead of the flying object 100 from the cockpit is reproduced and displayed, the flying object 100 is not displayed on the screen, and therefore, it becomes difficult to make a visual inspection of the distance between the flying object 100 and the on-earth object 200. Thus, it is possible to more effectively ease the difficulty in operating the flying object 100.

It should be noted that although the object taking the shape of the combat plane is moved in the virtual game space taking the shape of the air in this embodiment, the object taking the shape of the submarine may be moved in the virtual game space taking the shape of the sea.

Also, in this embodiment, each of the positions where the flying object will reach after a lapse of 1.0 second and 2.0 seconds is calculated regardless of the display state of the operating switches 20R and 20L. However, in operation of the operating switch 20R or 20L (while the moving direction is changed), a reaching position after a lapse of shorter time, such as 0.5 second, for example, may be calculated.

In addition, although the two times 1.0 second and 2.0 seconds are noted in this embodiment, times more than these may be noted. Furthermore, only the one time (after a lapse of 2.0 seconds, for example) may be noted.

Furthermore, in this embodiment, the predicted altitude where the flying object 100 will reach after a lapse of T seconds is displayed as the airframe altitude bar B2, but the current altitude of the flying object 100 may be displayed. This makes it possible for the player to know the difference information indicating the difference between the current altitude of the flying object 100 and the height above the sea level of the on-earth object 200 in the predicted reaching point after the lapse of T seconds.

In addition, in this embodiment, on the collinear in the vertical direction, the on-earth object height bar B1 is displayed so as to extend from the lower to the upper direction, and the airframe altitude bar B2 is displayed so as to extend from the upper to the lower direction. However, each of the on-earth object height bar B1 and the airframe altitude bar B2 may extend in the same direction without being restricted to the collinear in the vertical direction. For example, the on-earth object height bar B1 and the airframe altitude bar B2 are displayed and arranged to space a predetermined interval side by side, and both of the on-earth object height bar B1 and the airframe altitude bar B2 are displayed so as to extend to the upper direction from the lower edge.

In addition, in this embodiment, although the altitude of the airframe, the height above the sea level of the on-earth object, and the distance (space) between the altitude of the airframe and the height above the sea level of the on-earth object after a lapse of T seconds are represented by the two bars and the distance between the bars, these are represented by a numerical value. In addition, only the distance between the altitude of the airframe and the height above the sea level of the on-earth object may be represented by a bar or a numerical value. Or, only the altitude of the airframe and the height above the sea level of the on-earth object may be represented by a numerical value.

Although example embodiments of the present invention have been described and illustrated in detail, it is clearly understood that the same is by way of illustration and example only and is not to be taken by way of limitation, the spirit and scope of the present invention being limited only by the terms of the appended claims.

What is claimed is:

1. A non-transitory computer readable storage medium tangibly storing computer readable instructions to be executed by a processor of a game apparatus to perform a method which generates a display of a virtual game space in which an land object is arranged, and a moving object moving in said virtual game space on a screen, the method comprising:

changing a movement parameter defining a movement of said moving object in response to a player's operation;

predicting a reaching point where said moving object will reach after a lapse of a time T (T>0) on the basis of said movement parameter;

detecting at least any one of a current altitude of said moving object and an altitude of said moving object in the reaching point predicted by said predicting;

detecting a height of said land object in the reaching point predicted by said predicting; and generating an output which provides to said player difference information indicating a difference between the detected altitude and the detected height.

2. The non-transitory computer readable storage medium according to claim 1, wherein said generating the output includes generating an output of height information indicating said height as a part of said difference information, and generating an output of altitude information indicating said altitude as another part of said difference information.

3. The non-transitory computer readable storage medium according to claim 2, wherein said height information includes a first bar character extending in a vertical direction of said screen with a length corresponding to said height, and said altitude information includes a second bar character extending in the vertical direction of said screen with a length corresponding to said altitude.

4. The non-transitory computer readable storage medium according to claim 3, wherein said first bar character has a bar main body extending upward from a lower side of said screen and an upper edge portion set at a position corresponding to said height, and said second bar character has a bar main body extending downward from an upper side of said screen and a lower edge portion set at a position corresponding to said altitude, and a space from said upper edge portion to said lower edge portion means a difference between said height and said altitude.

5. The non-transitory computer readable storage medium according to claim 3, wherein said generating the output of the height information includes determining the length of said first bar character by a logarithmic arithmetic.

6. The non-transitory computer readable storage medium according to claim 1, wherein the method further comprises generating a different warning depending on a numerical range to which a subtracted value obtained by subtracting the detected height from the predicted altitude.

7. The non-transitory computer readable storage medium according to claim 6, wherein said generating a different warning includes generating a first warning to have a first manner when said subtracted value belongs to a first numerical range where numerical values above 0 are distributed, and generating a second warning to have a second manner when said subtracted value belongs to a second numerical range where numerical values below 0 are distributed.

8. The non-transitory computer readable storage medium according to claim 1, wherein the method further comprises:
  setting each of a plurality of numerical values as said T;
  respectively subtracting a plurality of the detected heights from a plurality of the detected altitudes with respect to the plurality of predicted reaching points; and
  specifying a minimum subtracted value out of the plurality of subtracted values calculated by said respective subtracting, wherein said generated output indicates the difference information corresponding to the minimum subtracted value specified by said specifying.

9. The non-transitory computer readable storage medium according to claim 1, wherein said changing includes changing a direction parameter defining a moving direction of said moving object in response to a first operation by said player, and changing a velocity parameter defining a moving velocity of said moving object in response to a second operation by said player.

10. A game apparatus which generates a display on a screen a virtual game space in which a land object is arranged, and a moving object moving in said virtual game space, the game apparatus comprising:
  change programmed logic circuitry for changing a movement parameter defining a movement of said moving object in response to a player's operation;
  predicting programmed logic circuitry for predicting a reaching point where said moving object will reach after a lapse of a time T (T>0) on the basis of said movement parameter;
  first detecting programmed logic circuitry for detecting at least any one of a current altitude of said moving object and an altitude of said moving object in the reaching point predicted by said predicting programmed logic circuitry;
  second detecting programmed logic circuitry for detecting a height of said land object in the reaching point predicted by said predicting programmed logic circuitry; and
  output programmed logic circuitry for generating an output to said player difference information indicating a difference between the altitude detected by said first detecting programmed logic circuitry and the height detected by said second detecting programmed logic circuitry.

11. A game method to be performed by execution of computer readable instructions, tangibly stored on a computer readable storage medium, by a game apparatus for displaying on a screen a virtual game space in which a land object is arranged, and a moving object moving in said virtual game space, the game method comprising the steps of:
  (a) changing a movement parameter defining a movement of said moving object in response to a player's operation of the game apparatus;
  (b) predicting a reaching point where said moving object will reach after a lapse of a time T (T>0) on the basis of said movement parameter;
  (c) detecting at least any one of a current altitude of said moving object and an altitude of said moving object in the reaching point predicted by said step (b);
  (d) detecting a height of said land object in the reaching point predicted by said step (b); and
  (e) generating an output to said player difference information indicating a difference between the altitude detected by said step (a) and the height detected by said step (d).

12. A game apparatus according to claim 10, wherein said generated output includes height information indicating said height as a part of said difference information, and altitude information indicating said altitude as another part of said difference information.

13. A game apparatus according to claim 12, wherein said height information includes a first bar character extending in a vertical direction of said screen with a length corresponding to said height, and said altitude information includes a second bar character extending in the vertical direction of said screen with a length corresponding to said altitude.

14. A game apparatus according to claim 13, wherein said first bar character has a bar main body extending upward from a lower side of said screen and an upper edge portion set at a position corresponding to said height, and said second bar character has a bar main body extending downward from an upper side of said screen and a lower edge portion set at a position corresponding to said altitude, and a space from said upper edge portion to said lower edge portion means a difference between said height and said altitude.

15. A game apparatus according to claim 13, wherein the length of said first bar character is determined by a logarithmic arithmetic.

16. A game apparatus according to claim 10, further comprising warning programmed logic circuitry for generating a different warning depending on a numerical range to which a subtracted value obtained by subtracting the height detected by said second detecting programmed logic circuitry from the altitude predicted by said predicting programmed logic circuitry belongs.

17. A game apparatus according to claim 16, wherein said warning programmed logic circuitry generates the warning so as to have a first manner when said subtracted value belongs to a first numerical range where numerical values above 0 are distributed, and generates the warning so as to have a second manner when said subtracted value belongs to a second numerical range where numerical values below 0 are distributed.

18. A game apparatus according to claim 10, further comprising:
  setting programmed logic circuitry for setting each of a plurality of numerical values as said T;

subtracting programmed logic circuitry for respectively subtracting a plurality of the heights detected by said second detecting programmed logic circuitry from a plurality of the altitudes detected by said first detecting programmed logic circuitry with respect to the plurality of reaching points predicted by said predicting programmed logic circuitry; and specifying programmed logic circuitry for specifying a minimum subtracted value out of the plurality of subtracted values calculated by said subtracting programmed logic circuitry, wherein said output programmed logic circuitry generates an output indicating the difference information corresponding to the minimum subtracted value specified by said specifying programmed logic circuitry.

19. A game apparatus according to claim 10, wherein said changing programmed logic circuitry includes first change programmed logic circuitry for changing a direction parameter defining a moving direction of said moving object in response to a first operation by said player, and second change programmed logic circuitry for changing a velocity parameter defining a moving velocity of said moving object in response to a second operation by said player.

20. A game method according to claim 11, wherein said generating the output step (e) includes a first information generating step for generating height information indicating said height as a part of said difference information, and a second information generating step for generating altitude information indicating said altitude as another part of said difference information.

21. A game method according to claim 20, wherein said height information includes a first bar character extending in a vertical direction of said screen with a length corresponding to said height, and said altitude information includes a second bar character extending in the vertical direction of said screen with a length corresponding to said altitude.

22. A game method according to claim 21, wherein said first bar character has a bar main body extending upward from a lower side of said screen and an upper edge portion set at a position corresponding to said height, and said second bar character has a bar main body extending downward from an upper side of said screen and a lower edge portion set at a position corresponding to said altitude, and a space from said upper edge portion to said lower edge portion means a difference between said height and said altitude.

23. A game method according to claim 21, wherein the length of said first bar character is determined by a logarithmic arithmetic.

24. A game method according to claim 11, further comprising a warning-generating step for generating a different warning depending on a numerical range to which a subtracted value obtained by subtracting the height detected by said detecting step (d) from the altitude predicted by said predicting step (b) belongs.

25. A game method according to claim 24, wherein said warning-generating step includes generating said warning so as to have a first manner when said subtracted value belongs to a first numerical range where numerical values above 0 are distributed, and generating said warning so as to have a second manner when said subtracted value belongs to a second numerical range where numerical values below 0 are distributed.

26. A game method according to claim 11, further comprising:

a setting step for setting each of a plurality of numerical values as said T;

a subtracting step for respectively subtracting a plurality of the heights detected by said detecting step (d) from a plurality of the altitudes detected by said detecting step (c) with respect to the plurality of reaching points predicted by said predicting step (b); and a specifying step for specifying a minimum subtracted value out of the plurality of subtracted values calculated by said subtracting step, wherein said generating the output step includes generating the difference information corresponding to the minimum subtracted value specified by said specifying step.

27. A game method according to claim 11, wherein said changing step (a) includes a first change step for changing a direction parameter defining a moving direction of said moving object in response to a first operation by said player, and a second change step for changing a velocity parameter defining a moving velocity of said moving object in response to a second operation by said player.

28. A computer system comprising;
a non-transitory readable storage medium tangibly storing computer readable instructions;
a processor configured to execute the instructions to:
generate a display of a virtual game space in which a non-moving object is arranged, and a moving object moving in said virtual game space on a screen;
change a movement parameter defining a movement of said moving object in response to a player's operation;
predict a reaching point where said moving object will reach after a lapse of a time T (T>0) on the basis of said movement parameter;
detect at least any one of a current altitude of said moving object and an altitude of said moving object in the predicted reaching point;
detect a height of the non-moving object in the predicted reaching point; and
generate an output which provides to said player difference information indicating a difference between the detected altitude and the detected height.

29. The computer system according to claim 28, wherein the processor is configured to execute the instructions to generate the output by generating an output of height information indicating said height as a part of said difference information, and generating an output of altitude information indicating said altitude as another part of said difference information.

30. The computer system according to claim 29, wherein said height information includes a first bar character extending in a vertical direction of said screen with a length corresponding to said height, and said altitude information includes a second bar character extending in the vertical direction of said screen with a length corresponding to said altitude.

31. The computer system according to claim 30, wherein said first bar character has a bar main body extending upward from a lower side of said screen and an upper edge portion set at a position corresponding to said height, and said second bar character has a bar main body extending downward from an upper side of said screen and a lower edge portion set at a position corresponding to said altitude, and a space from said upper edge portion to said lower edge portion means a difference between said height and said altitude.

32. The computer system according to claim 30, wherein the output of the height information is generated by determining the length of said first bar character by a logarithmic arithmetic.

33. The computer system according to claim 28, wherein the processor is further configured to execute instructions to generate a different warning depending on a numerical range to which a subtracted value obtained by subtracting the detected height from the predicted altitude.

34. The computer system according to claim 33, wherein the processor is configured to execute the instructions to generate a different warning includes generating a first warning to have a first manner when said subtracted value belongs to a first numerical range where numerical values above 0 are distributed, and generating a second warning to have a second manner when said subtracted value belongs to a second numerical range where numerical values below 0 are distributed.

35. The computer system according to claim 28, wherein the processor is further configured to execute instructions to:
set each of a plurality of numerical values as said T;
respectively subtract a plurality of the detected heights from a plurality of the detected altitudes with respect to the plurality of predicted reaching points; and
specify a minimum subtracted value out of the plurality of subtracted values calculated by said respective subtracting, wherein said generated output indicates the difference information corresponding to the minimum subtracted value specified by the specifying.

36. The computer system according to claim 28, wherein the processor is configured to execute the instructions to perform said change by changing a direction parameter defining a moving direction of said moving object in response to a first operation by said player, and changing a velocity parameter defining a moving velocity of said moving object in response to a second operation by said player.

37. The computer system according to claim 28, wherein the non-moving object is a land-based object.

38. The computer system according to claim 28, wherein the non-moving object is an on-planet object.

* * * * *